(12) United States Patent
Iwata et al.

(10) Patent No.: US 9,702,421 B2
(45) Date of Patent: Jul. 11, 2017

(54) PARKING DEVICE

(71) Applicant: AISIN AW CO., LTD., Anjo-shi, Aichi-ken (JP)

(72) Inventors: Akihito Iwata, Hekinan (JP); Tadamasa Takei, Nagoya (JP); Kenichi Naka, Anjo (JP)

(73) Assignee: AISIN AW CO., LTD., Anjo-shi (JP)

( * ) Notice: Subject to any disclaimer, the term of this patent is extended or adjusted under 35 U.S.C. 154(b) by 0 days.

(21) Appl. No.: 14/891,766

(22) PCT Filed: Jun. 17, 2014

(86) PCT No.: PCT/JP2014/066042
§ 371 (c)(1),
(2) Date: Nov. 17, 2015

(87) PCT Pub. No.: WO2014/203898
PCT Pub. Date: Dec. 24, 2014

(65) Prior Publication Data
US 2016/0123412 A1  May 5, 2016

(30) Foreign Application Priority Data

Jun. 17, 2013 (JP) .................................. 2013-127025
Oct. 23, 2013 (JP) .................................. 2013-220443

(51) Int. Cl.
*B60T 1/06* (2006.01)
*F16D 63/00* (2006.01)
(Continued)

(52) U.S. Cl.
CPC ............ *F16D 63/006* (2013.01); *B60T 1/005* (2013.01); *B60T 1/06* (2013.01); *B60T 1/062* (2013.01);
(Continued)

(58) Field of Classification Search
CPC .. F16H 61/22; F16H 63/3433; F16H 63/3483; F16H 63/3458; B60T 1/005;
(Continued)

(56) References Cited

U.S. PATENT DOCUMENTS 3,207,252 A * 9/1965 Cripe ..................... B60K 31/08
                                                                123/389
3,831,486 A * 8/1974 Yost ......................... B64D 1/06
                                                                24/603
(Continued)

FOREIGN PATENT DOCUMENTS

EP      1 408 260 A1   4/2004
JP      49102019 A     9/1974
(Continued)

OTHER PUBLICATIONS

International Search Report for PCT/JP2014/066042 dated Sep. 16, 2014 [PCT/ISA/210].
(Continued)

*Primary Examiner* — Christopher Schwartz
(74) *Attorney, Agent, or Firm* — Sughrue Mion, PLLC

(57) ABSTRACT

A hydraulic unit and an electromagnetic unit are disposed in directions that are orthogonal to each other. In addition, in a parking locked state, a roller of a pin of a piston rod and a lower abutment surface of a distal end portion of a solenoid shaft are in abutment with each other. Further, when a coil is not energized, the solenoid shaft is allowed to be moved rightward in the drawing through abutment between the pin of the piston rod and the distal end portion of the solenoid shaft during movement of the piston rod.

13 Claims, 14 Drawing Sheets

(51) Int. Cl.
  *B60T 1/00* (2006.01)
  *F16H 63/34* (2006.01)
  *F16D 65/28* (2006.01)
  *F16D 121/20* (2012.01)

(52) U.S. Cl.
  CPC ............ *F16D 63/00* (2013.01); *F16D 65/28* (2013.01); *F16H 63/34* (2013.01); *F16D 2121/20* (2013.01)

(58) Field of Classification Search
  CPC . B60T 1/06; B60T 1/062; F15B 15/26; F16D 63/006
  USPC ................ 74/411.5, 577 R; 188/31, 69, 265, 188/156–164
  See application file for complete search history.

(56) References Cited

U.S. PATENT DOCUMENTS

| | | |
|---|---|---|
| 5,671,638 A | 9/1997 | Hattori et al. |
| 2005/0098400 A1 | 5/2005 | Kleinert et al. |
| 2007/0193838 A1 | 8/2007 | Inagaki et al. |
| 2007/0283735 A1 | 12/2007 | Schweiher et al. |
| 2008/0236967 A1 | 10/2008 | Mayr |
| 2009/0140189 A1 | 6/2009 | Kokubu et al. |
| 2011/0023647 A1 | 2/2011 | Engel et al. |
| 2014/0123799 A1 | 5/2014 | Landino et al. |
| 2016/0082933 A1* | 3/2016 | Iwata ...................... B60T 1/005 188/163 |
| 2016/0091037 A1* | 3/2016 | Iwata ...................... B60T 1/005 188/152 |
| 2016/0208916 A1* | 7/2016 | Kokubu .................. B60T 1/005 |

FOREIGN PATENT DOCUMENTS

| | | |
|---|---|---|
| JP | 08-216722 A | 8/1996 |
| JP | 10-136627 A | 5/1998 |
| JP | 2002-246226 A | 8/2002 |
| JP | 2005291376 A | 10/2005 |
| JP | 2007132394 A | 5/2007 |
| JP | 2008-128444 A | 6/2008 |
| JP | 2009-520163 A | 5/2009 |
| JP | 2009-127692 A | 6/2009 |
| JP | 2014148199 A | 8/2014 |
| JP | 2015000689 A | 1/2015 |
| WO | 0063593 A1 | 10/2000 |
| WO | 2014/203899 A1 | 12/2014 |
| WO | 2014/203900 A1 | 12/2014 |
| WO | 2015/060412 A1 | 4/2015 |

OTHER PUBLICATIONS

Communication dated Apr. 25, 2016 from the European Patent Office issued in corresponding Application No. 14814454.6.
An Office Action dated Feb. 14, 2017, which issued during the prosecution of U.S. Appl. No. 14/891,858.

* cited by examiner

HYDRAULIC PRESSURE

HYDRAULIC PRESSURE

HYDRAULIC PRESSURE

HYDRAULIC PRESSURE

PARKING DEVICE

CROSS REFERENCE TO RELATED APPLICATIONS

This application is a National Stage of International Application No. PCT/JP2014/066042 filed Jun. 17, 2014, claiming priority based on Japanese Patent Application Nos. 2013-127025 filed Jun. 17, 2013 and 2013-220443 filed Oct. 23, 2013, the contents of all of which are incorporated herein by reference in their entirety.

TECHNICAL FIELD

The present disclosure relates to a parking device, and particularly to a parking device mounted on a vehicle to establish a parking locked state and a parking unlocked state.

BACKGROUND ART

Hitherto, there has been proposed a parking device of this type, including a locking mechanism including a hydraulic piston 832 and a cylindrical tapered member 858 disposed on the same axis, the hydraulic piston 832 being coupled to a parking rod that operates in conjunction with a parking lock pawl that is engageable with a parking ratchet, and the tapered member 858 being fitted with a plunger of a solenoid 856 as illustrated in FIG. 15 and FIG. 16 which is a cross-sectional view taken along the line X-X of FIG. 15 (see Patent Document 1, for example). FIG. 15 illustrates the locking mechanism in the parking unlocked state. In the parking device, when the tapered member 858 is urged toward the hydraulic piston 832 (leftward in FIG. 15) by a spring 859 in the parking unlocked state, the hydraulic piston 832 is moved leftward in FIG. 15 with lug portions 862 formed on three plates 860 provided around the tapered member 858 pushed outward by the tapered member 858, which establishes the parking locked state. When the hydraulic piston 832 is moved rightward in FIG. 15 by a hydraulic pressure in the parking locked state and the tapered member 858 is pressed against the urging force of the spring 859, meanwhile, the lug portions 862 are closed inward to engage with a catching portion 834 of the hydraulic piston 832, and further the tapered member 858 is fixed in position by the solenoid 856 to lock the hydraulic piston 832 in position, which establishes the parking unlocked state. With such a configuration, the parking unlocked state can be held even when a hydraulic pressure for a hydraulic piston device is reduced with an engine-driven mechanical pump stopped during idle stop.

RELATED-ART DOCUMENTS

Patent Documents

[Patent Document 1] Published Japanese Translation of PCT Application No. 2009-520163 (JP 2009-520163 A)

SUMMARY OF THE DISCLOSURE

In the parking device discussed above, when switching is performed from the parking unlocked state to the parking locked state, the hydraulic piston is moved until movement of the hydraulic piston is restricted. Therefore, when switching is performed to the parking locked state by a hydraulic pressure thereafter, it is necessary to move the hydraulic piston relatively significantly, and a collision is caused between the hydraulic piston and the lug portions.

In the parking device discussed above, in addition, the hydraulic piston, the solenoid, the tapered member, and so forth are provided on the same axis. Therefore, a space is required in the axial direction of the hydraulic piston, which is not suitable in the case where the parking device is disposed in a limited space. In particular, in the case where the parking device is incorporated in FF (front-engine front-drive) vehicles, the mountability of the parking device is an important issue. In order to address such an issue, there is also proposed a parking device in which a solenoid etc. is disposed in a direction that is orthogonal to a shaft of a hydraulic piston. In the parking device, a hook portion is formed at an end portion of a hydraulic piston, and a lug portion is formed at an end portion of a working member that is operable in a direction that is orthogonal to the direction of a shaft of the hydraulic piston by a solenoid attached to a side portion of the shaft of the hydraulic piston. The parking locked state is established by fitting the lug portion with the hook portion with the hydraulic piston moved rightward in the drawing by a hydraulic pressure against the urging force of a spring. Meanwhile, switching from the parking locked state to the parking unlocked state is performed by canceling a hydraulic pressure for the hydraulic piston and operating the working member downward in the drawing using the solenoid to release fitting between the lug portion and the hook portion. With the locking mechanism of the parking lock device, switching from the parking unlocked state to the parking locked state cannot be performed when a hydraulic pressure is not applied to the hydraulic piston.

It is a main object of the parking device according to the present disclosure to allow components to be suitably disposed in a limited space, to reduce the amount of movement of a shaft member of a hydraulic unit made when switching is performed from a parking locked state to a parking unlocked state, to suppress occurrence of a collision between the shaft member of the hydraulic unit and a shaft member of an electromagnetic unit, and to establish the parking locked state more adequately.

In order to achieve the foregoing main object, the parking device according to the present disclosure adopts the following means.

The present disclosure provides a parking device mounted on a vehicle to establish a parking locked state and a parking unlocked state, including:

a hydraulic unit that includes a first shaft member that is movable in a first direction, a first elastic member that urges the first shaft member toward a lock side on which the parking locked state is established, in the first direction, using an elastic force, and a hydraulic pressure generation portion that moves the first shaft member toward an unlock side which is opposite to the lock side, in the first direction, using a hydraulic pressure against the elastic force of the first elastic member; and an electromagnetic unit that includes a second shaft member that is movable in a second direction which is orthogonal to the first direction, a second elastic member that urges the second shaft member toward the first shaft member, in the second direction, using an elastic force, and a magnetic force holding portion that can hold the second shaft member on a side of the first shaft member using a magnetic force, in which:

the first shaft member is provided with an abutment portion that can abut against a distal end portion of the second shaft member;

a lock side surface of the distal end portion of the second shaft member on the lock side is formed to be inclined toward the lock side from a distal end side toward a base end side of the second shaft member; and the hydraulic unit is configured such that the abutment portion of the first shaft member abuts against the lock side surface of the second shaft member when the parking locked state is established.

In the parking device according to the present disclosure, when a hydraulic pressure that resists against the elastic force of the first elastic member is applied to the first shaft member when the second shaft member is not held on the first shaft member side by a magnetic force in the parking locked state, the first shaft member is moved toward the unlock side while moving the second shaft member away from the first shaft member through abutment between the abutment portion of the first shaft member and the distal end portion of the second shaft member, which establishes the parking unlocked state. In the parking device according to the present disclosure, when the parking locked state is established, the abutment portion of the first shaft member is in abutment with the lock side surface of the second shaft member. Thus, it is possible to reduce the amount of movement of the first shaft member toward the unlock side required to establish the parking unlocked state and to suppress a collision between the abutment portion of the first shaft member and the distal end portion of the second shaft member compared to a configuration in which such components are not in abutment with each other. If a state in which the second shaft member can be held on the first shaft member side by a magnetic force is (has been) established before a hydraulic pressure is reduced (e.g. before an engine-driven mechanical pump that generates the hydraulic pressure is stopped by idle stop) when the parking unlocked state is established by a hydraulic pressure, the first shaft member is held in position with the abutment portion of the first shaft member in abutment with the distal end portion of the second shaft member when a hydraulic pressure is reduced thereafter, although a force toward the lock side is applied to the first shaft member by the elastic force of the first elastic member. Consequently, the parking unlocked state can be held even when a hydraulic pressure is reduced after the parking unlocked state is established by a hydraulic pressure. When a hydraulic pressure is reduced when the second shaft member is not held on the first shaft member side by a magnetic force in the parking unlocked state, the first shaft member is moved toward the lock side by the elastic force of the first elastic member while moving the second shaft member away from the first shaft member through abutment between the abutment portion of the first shaft member and the distal end portion of the second shaft member, which establishes the parking locked state. Consequently, the parking locked state can be established more adequately when the second shaft member is not held on the first shaft member side by a magnetic force and a hydraulic pressure that resists against the elastic force of the first elastic member is not applied to the first shaft member. Originally, the hydraulic unit (in particular, the first shaft member) and the electromagnetic unit (in particular, the second shaft member) are disposed in directions that are orthogonal to each other. Thus, such components can be suitably disposed in a limited space compared to a configuration in which the two components are disposed in the direction of the same axis.

In the thus configured parking device according to the present disclosure, the second shaft member of the electromagnetic unit may be moved away from the first shaft member when the parking locked state is established and the abutment portion of the first shaft member is in abutment with the lock side surface of the second shaft member compared to a time when the abutment portion of the first shaft member is not in abutment with the distal end portion of the second shaft member.

In the parking device according to the present disclosure, in addition, the lock side surface of the second shaft member may be formed as a curved surface that is convex toward the lock side. With this configuration, a component, in the second direction, of the force applied from the first shaft member to the second shaft member is increased along with movement of the first shaft member toward the unlock side during movement of the first shaft member toward the unlock side due to a hydraulic pressure. Thus, the first shaft member can be moved toward the unlock side while smoothly moving the second shaft member away from the first shaft member. In the parking device according to such an aspect of the present disclosure, the abutment portion of the first shaft member may be formed in a cylindrical shape; and the lock side surface of the second shaft member may be formed as a curved surface with a radius of curvature that is smaller than a radius of curvature of the abutment portion of the first shaft member. With this configuration, the component discussed above tends to be increased more during movement of the first shaft member toward the unlock side due to a hydraulic pressure. Thus, the first shaft member can be moved toward the unlock side while smoothly moving the second shaft member away from the first shaft member even when the hydraulic pressure is more or less low.

In the parking device according to the present disclosure, further, an unlock side surface of the distal end portion of the second shaft member on the unlock side may be formed to be inclined toward the unlock side from a distal end side toward a base end side of the second shaft member. With such a configuration, the second shaft member can be moved away from the first shaft member by a component, in the second direction, of the force applied from the first shaft member to the second shaft member when the abutment portion of the first shaft member and the unlock side surface of the second shaft member abut against each other during movement of the first shaft member toward the lock side.

In the parking device according to the present disclosure, the magnetic force holding portion may be capable of holding the second shaft member on the first shaft member side using the magnetic force when a coil is energized; and the electromagnetic unit may be configured to allow the second shaft member to be moved away from the first shaft member, in the second direction, by a force applied from the abutment portion of the first shaft member to the distal end portion of the second shaft member during movement of the first shaft member when the coil is not energized. In this case, when the coil is energized, the second shaft member can be held on the first shaft member side by a magnetic force. Thus, when a hydraulic pressure is reduced when the coil is energized in the parking unlocked state, movement of the first shaft member toward the lock side is restricted through abutment between the abutment portion of the first shaft member and the distal end portion of the second shaft member. Consequently, the parking unlocked state can be held. In the parking device according to the present disclosure, moreover, the second shaft member is not moved (stroked) in the second direction by energizing the coil. Thus, the desired magnetic flux can be reduced compared to a configuration in which the second shaft member is moved in the second direction by energizing the coil. As a result, the number of turns of the coil required to obtain the desired magnetic flux can be reduced, which makes it possible to downsize the coil and hence the electromagnetic unit. When the coil is not energized, meanwhile, the second shaft member is allowed to be moved away from the first shaft member. Thus, when a hydraulic pressure is reduced when the coil is not energized in the parking unlocked state, the first shaft member is moved toward the lock side along with movement of the second shaft member away from the first shaft member through abutment between the abutment portion of the first shaft member and the distal end portion of the second shaft member, which establishes the parking locked state. Consequently, the parking locked state can be established more adequately when a hydraulic pressure that resists against the elastic force of the first elastic member is not applied to the first shaft member with the coil not energized (including an occasion in which the coil cannot be energized for some reason).

In the parking device according to the present disclosure, the magnetic force holding portion may be a permanent magnet that holds the second shaft member on the first shaft member side using the magnetic force; and the electromagnetic unit may be configured to release holding of the second shaft member by the permanent magnet and allow the second shaft member to be moved away from the first shaft member, in the second direction, by a force applied from the abutment portion of the first shaft member to the distal end portion of the second shaft member during movement of the first shaft member when the coil is energized. In this case, when the coil is not energized, the second shaft member is held on the first shaft member side by the magnetic force of the permanent magnet. Thus, when a hydraulic pressure is reduced when the coil is not energized in the parking unlocked state, movement of the first shaft member toward the lock side is restricted through abutment between the abutment portion of the first shaft member and the distal end portion of the second shaft member. Consequently, the parking unlocked state can be held. When the coil is energized, meanwhile, the second shaft member is allowed to be moved away from the first shaft member. Thus, when a hydraulic pressure is reduced when the coil is energized in the parking unlocked state, the first shaft member is moved toward the lock side along with movement of the second shaft member away from the first shaft member through abutment between the abutment portion of the first shaft member and the distal end portion of the second shaft member, which establishes the parking locked state. Consequently, the parking locked state can be established more adequately.

A modification of the present disclosure provides
a parking device mounted on a vehicle to establish a parking locked state and a parking unlocked state, including:
a first shaft member that is movable in a first direction by an elastic force of a first elastic member or a hydraulic pressure to switch between the parking locked state and the parking unlocked state; and
a magnetic unit that includes a second shaft member that is advanceable and retractable in a second direction which is orthogonal to the first direction and that can restrict movement of the first shaft member through abutment between a distal end portion of the second shaft member and an abutment portion provided to the first shaft member, a second elastic member that urges the second shaft member toward the first shaft member in the second direction using an elastic force, a permanent magnet that locks the second shaft member using a magnetic force so as not to retract from the first shaft member, and an unlock portion that unlocks the second shaft member which has been locked by the permanent magnet along with energization of a coil, in which
the magnetic unit is configured to allow the second shaft member to be retracted from the first shaft member by a force applied from the abutment portion of the first shaft member to the distal end portion of the second shaft member by the elastic force of the first elastic member or the hydraulic pressure when the coil is energized.

In the parking device according to the modification of the present disclosure, the first shaft member and the second shaft member of the magnetic unit are disposed so as to move in directions that are orthogonal to each other. Thus, such components can be suitably disposed in a limited space compared to a configuration in which the two components are disposed (on the same axis) so as to be movable in the same direction.

When the coil of the unlock portion of the magnetic unit is not energized, in addition, the second shaft member is locked by the magnetic force of the permanent magnet so as not to retract from the first shaft member. Consequently, movement of the first shaft member in the first direction is restricted when the abutment portion of the first shaft member and the distal end portion of the second shaft member abut against each other, which makes it possible to hold the parking locked state and the parking unlocked state. When the coil is energized, on the other hand, the second shaft member which has been locked by the permanent magnet is unlocked by the unlock portion, and the second shaft member is allowed to be retracted from the first shaft member by a force applied from the abutment portion of the first shaft member to the distal end portion of the second shaft member by the elastic force of the first elastic member or the hydraulic pressure. Consequently, the first shaft member is moved in the first direction by the elastic force of the first elastic member or the hydraulic pressure along with retraction of the second shaft member from the first shaft member, which makes it possible to switch between the parking locked state and the parking unlocked state. From what has been described above, it is not necessary to energize the coil in order to hold the parking locked state and the parking unlocked state, which makes it possible to suppress electric power consumption.

In the thus configured parking device according to the modification of the present disclosure, the permanent magnet may be fixed to the second shaft member; the unlock portion may include a facing portion that is formed from a magnetic body and that faces the permanent magnet in the second direction; and the second shaft member may be locked by the attraction between the permanent magnet and the facing portion. In this case, it is considered that the permanent magnet can be fixed to the second shaft member easily and accurately by bonding or the like.

In the parking device according to the modification of the present disclosure, in addition, the permanent magnet may be fixed to the unlock portion; the second shaft member may include a magnetic body portion formed from a magnetic body; the permanent magnet and the magnetic body portion may be disposed so as to face each other in the second direction; and the second shaft member may be locked by the attraction between the permanent magnet and the magnetic body portion.

In the parking device according to the modification of the present disclosure in the aspect in which the permanent magnet is fixed to the second shaft member or the unlock portion, the second shaft member may include a shaft formed from a non-magnetic body and a plunger formed from a magnetic body; the shaft may include a small diameter portion that has the distal end portion and an expanded diameter portion that extends from the small diameter portion toward a side that is opposite to the abutment portion and that is larger in diameter than the small diameter portion; the plunger may be formed to be larger in diameter than the expanded diameter portion; the shaft and the plunger may be urged toward the first shaft member by the elastic force of the second elastic member such that an end surface of the plunger on a side of the first shaft member abuts against an end surface of the expanded diameter portion on a side that is opposite to a side of the small diameter portion, an end surface of the expanded diameter portion on the small diameter portion side abuts against a part of the unlock portion, and the distal end portion of the shaft can abut against the abutment portion of the first shaft member; and the permanent magnet may be disposed so as to surround an outer periphery of the expanded diameter portion.

With this configuration, the shaft and the plunger are urged together toward the first shaft member by the elastic force of the second elastic member so that an end surface of the expanded diameter portion of the shaft on the small diameter portion side abuts against a part of the unlock portion. Thus, rattle of the shaft in the second direction can be suppressed.

In addition, the permanent magnet is disposed so as to surround the outer periphery of the expanded diameter portion of the shaft. Thus, even if the shaft rattles in the radial direction, such rattle can be absorbed by the clearance between the outer peripheral surface of the expanded diameter portion and the inner peripheral surface of the permanent magnet. As a result, a magnetic gap formed at the outer periphery of the plunger can be reduced compared to a configuration in which the shaft, the plunger, and the permanent magnet are constituted integrally. In addition, the shaft is formed from a non-magnetic body. Thus, leakage of magnetic flux from the magnetic unit can be reduced. As a result, the magnetic efficiency can be enhanced while suppressing an increase in size of the magnetic unit.

In the parking device according to the modification of the present disclosure in the aspect in which the permanent magnet is disposed so as to surround the outer periphery of the expanded diameter portion of the shaft, a length of the permanent magnet in the second direction may be smaller than a length of the expanded diameter portion in the second direction. With this configuration, in the case where the permanent magnet is fixed to the plunger, it is possible to suppress abutment (a collision) of the permanent magnet against a part (the facing portion which faces the permanent magnet in the second direction) of the unlock portion when the shaft and the plunger are moved toward the first shaft member, which protects the permanent magnet better. In the case where the permanent magnet is fixed to the unlock portion, meanwhile, it is possible to suppress abutment (a collision) of the permanent magnet against the plunger when the shaft and the plunger are moved toward the first shaft member, which protects the permanent magnet better.

In the parking device according to the modification of the present disclosure, the distal end portion of the second shaft member may have an unlock side surface that receives a force from the abutment portion of the first shaft member during movement of the first shaft member toward a lock side, in the first direction, on which the parking locked state is established; and the unlock side surface may be formed to be inclined toward the unlock side from a distal end portion side toward a base end portion side of the second shaft member. With this configuration, the second shaft member can be retracted from the first shaft member by a component, in the second direction, of the force applied from the first shaft member to the second shaft member when the abutment portion of the first shaft member and the unlock side surface of the distal end portion of the second shaft member abut against each other during movement of the first shaft member toward the lock side.

In the parking device according to the modification of the present disclosure, in addition, the distal end portion of the second shaft member may have a lock side surface that receives a force from the abutment portion of the first shaft member during movement of the first shaft member toward an unlock side, in the first direction, on which the parking unlocked state is established; and the lock side surface may be formed to be inclined toward the lock side from a distal end portion side toward a base end portion side of the second shaft member. With this configuration, the second shaft member can be retracted from the first shaft member by a component, in the second direction, of the force applied from the first shaft member to the second shaft member when the abutment portion of the first shaft member and the lock side surface of the distal end portion of the second shaft member abut against each other during movement of the first shaft member toward the unlock side.

In the parking device according to the modification of the present disclosure, further, the abutment portion may be constituted as a roller that is rotatable with respect to the first shaft member. With this configuration, the frictional resistance between the abutment portion of the first shaft member and the distal end portion of the second shaft member can be reduced.

In the parking device according to the modification of the present disclosure, additionally, the magnetic unit may include a bearing member that slidably supports the second shaft member. With this configuration, it is possible to make movement of the second shaft member in the second direction smoother.

In the parking device according to the modification of the present disclosure, the first shaft member may be formed with a hole portion into which the distal end portion of the second shaft member is advanceable and which penetrates through the first shaft member; and the distal end portion of the second shaft member may be positioned in the hole portion.

In the parking device according to the modification of the present disclosure, the magnetic unit may be configured such that when the coil is not energized, the second shaft member is not retracted from the first shaft member by a force applied from the abutment portion of the first shaft member to the distal end portion of the second shaft member by the elastic force of the first elastic member, but is allowed to be retracted from the first shaft member by a force applied from the abutment portion of the first shaft member to the distal end portion of the second shaft member by the elastic force of the first elastic member and a hydraulic pressure that resists against a force with which the permanent magnet locks the second shaft member.

In the parking device according to the modification of the present disclosure, the first shaft member may be urged by the elastic force of the first elastic member toward a lock side, in the first direction, on which the parking lock is established, and moved by a hydraulic pressure that resists against the elastic force of the first elastic member toward an unlock side, in the first direction, on which the parking unlocked state is established.

DETAILED DESCRIPTION OF THE PREFERRED EMBODIMENTS

Now, a mode for carrying out the present disclosure will be described by way of preferred embodiments.

Figure 1:
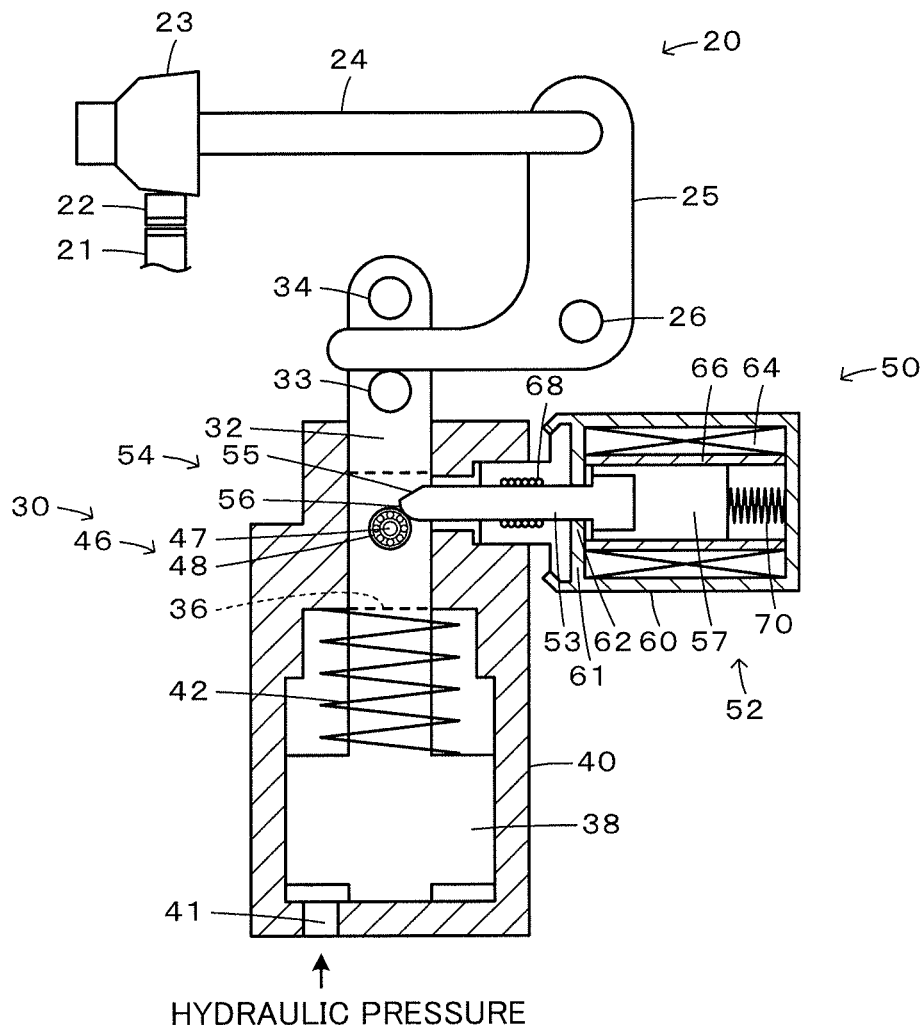
FIG. 1 is a diagram illustrating a schematic configuration of a parking device 20 according to a first embodiment of the present disclosure in a parking locked state.
Figure 2:
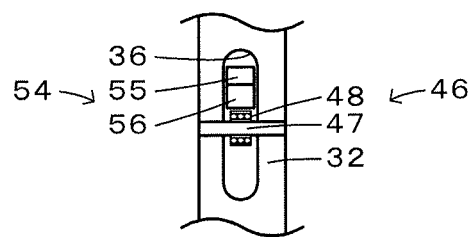
FIG. 2 is a diagram illustrating a schematic configuration of a hole portion 36 formed in a piston rod 32 of the parking device 20.
Figure 3:
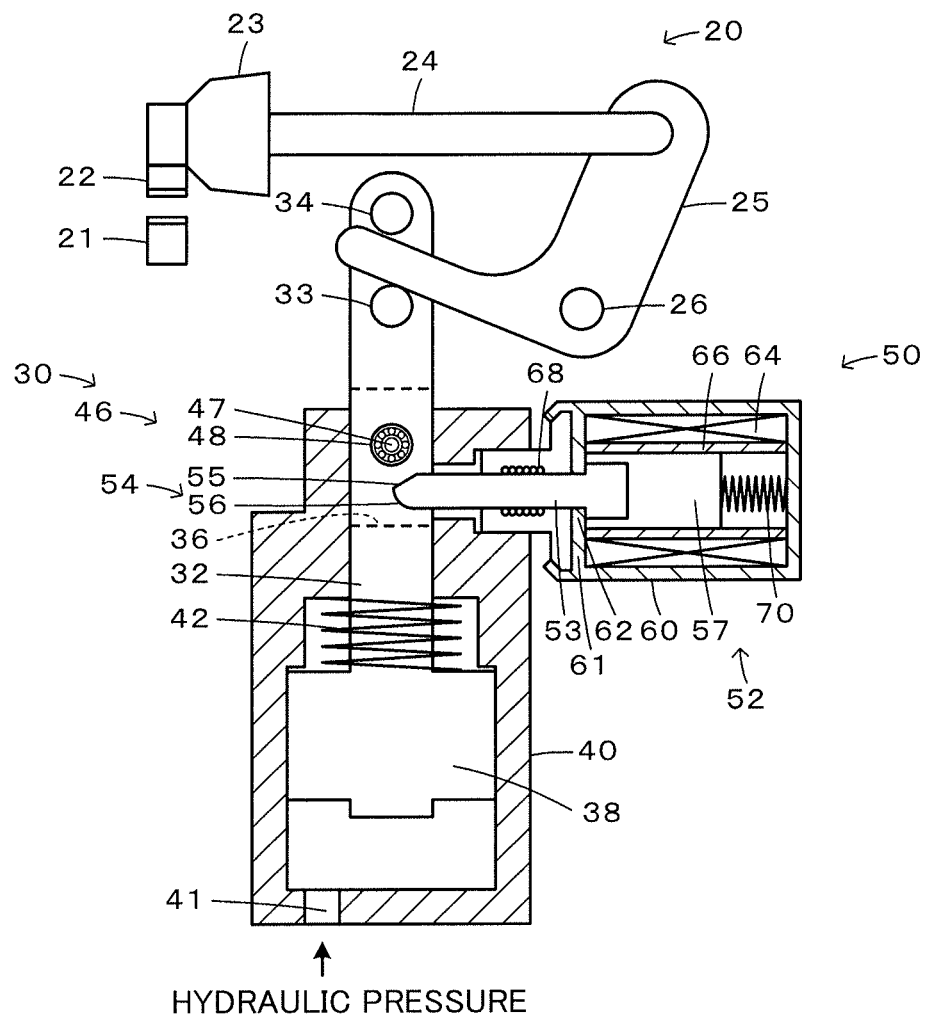
FIG. 3 is a diagram illustrating a schematic configuration of the parking device 20 according to the first embodiment in a parking unlocked state.

FIG. 1 is a diagram illustrating a schematic configuration of a parking device 20 according to a first embodiment of the present disclosure in a parking locked state. FIG. 2 is a diagram illustrating a schematic configuration around a hole portion 36 formed in a piston rod 32 of the parking device 20. FIG. 3 is a diagram illustrating a schematic configuration of the parking device 20 according to the first embodiment in a parking unlocked state (with the parking unlocked state established by a hydraulic pressure).

The parking device 20 according to the first embodiment is mounted on a vehicle. As illustrated in FIGS. 1 and 3, the parking device 20 includes: a parking gear 21 attached to a rotary shaft coupled to the side of an axle; a parking pawl 22 having a lug-like engagement portion that can mesh with the parking gear 21; a parking rod 24, to one end portion of which a cam member 23 is attached, the cam member 23 being abutting against the back surface of the lug-like engagement portion of the parking pawl 22 to turn the parking pawl 22; a turning member 25, one end portion of which is rotatably attached to the other end portion of the parking rod 24, the turning member 25 being turnable about a rotary shaft 26; a hydraulic unit 30 that applies a force to the other end portion of the turning member 25 through movement of the piston rod 32 which serves as a first shaft member in a first direction (up-down direction in the drawing) to turn the turning member 25; and an electromagnetic unit (magnetic unit) 50 that holds a solenoid shaft 52 that serves as a second shaft member that is movable in a second direction (left-right direction in the drawing) that is orthogonal to the first direction using a magnetic force when a coil 64 is energized to restrict movement of the piston rod 32 in the up-down direction in the drawing. In the parking device 20, as discussed in detail later, when the piston rod 32 is moved upward in the drawing from the parking locked state of FIG. 1, the turning member 25 is turned clockwise in the drawing to move the parking rod 24 rightward in the drawing, and the parking pawl 22 is moved upward in the drawing by the cam member 23 to be released from meshing with the parking gear 21, which establishes the parking unlocked state. When the piston rod 32 is moved downward in the drawing from the parking unlocked state of FIG. 3, meanwhile, the turning member 25 is turned counterclockwise in the drawing to move the parking rod 24 leftward in the drawing, and the parking pawl 22 is moved downward in the drawing by the cam member 23 to be brought into meshing with the parking gear 21, which establishes the parking locked state. Hereinafter, the lower side in the drawing and the upper side in the drawing are occasionally referred to as a "lock side" and an "unlock side", respectively.

The hydraulic unit 30 includes: the piston rod 32 which is movable in the up-down direction in the drawing and to which the other end portion of the turning member 25 is attached with a relatively large allowance by two pins 33 and 34; a piston 38 formed integrally with the piston rod 32; a case (cylinder) 40 which houses the piston 38 and in which a working oil inlet/discharge hole 41 for introducing working oil is formed; and a return spring 42 that serves as an elastic member disposed in the case 40 to urge the piston 38 downward in the drawing (toward the lock side) using an elastic force. In the hydraulic unit 30, the piston 38 (piston rod 32) is moved upward in the drawing (toward the unlock side) by a hydraulic pressure that resists against the elastic force of the return spring 42.

As illustrated in FIGS. 1 to 3, the piston rod 32 is formed with the hole portion 36 (see in particular FIG. 2) which extends in the up-down direction in the drawing, and a pin 46 that extends across the hole portion 36 in the left-right direction in FIG. 2 (front-back direction in FIG. 1) is provided. The pin 46 includes a support shaft (shaft portion) 47 that is cylindrical in shape and that is fixed to the piston rod 32, and a roller 48 that serves as an abutment portion that is hollow and cylindrical in shape and that is rotatable with respect to the support shaft 47. As illustrated in FIG. 1, the roller 48 of the pin 46 of the piston rod 32 is in abutment with a lower abutment surface 56 of a distal end portion 54 of a solenoid shaft 52 (to be discussed in detail later).

As illustrated in FIGS. 1 and 3, the electromagnetic unit 50 includes: the solenoid shaft 52 which is movable in the left-right direction in the drawing and which includes a small diameter portion 53 and a large diameter portion 57 that is larger in outside diameter than the small diameter portion 53; a yoke 60 that serves as a case that houses the large diameter portion 57 of the solenoid shaft 52; the coil 64 which is disposed on the inner peripheral side of the yoke 60; a core 66 disposed on the inner peripheral side of the coil 64 to support the large diameter portion 57 of the solenoid shaft 52 so as to be slidable in the left-right direction in the drawing; a bearing member (linear motion bearing) 68 fixed to the yoke 60 to support the small diameter portion 53 of the solenoid shaft 52 so as to be slidable in the left-right direction in the drawing; and a spring 70 disposed inside the yoke 60 to urge the solenoid shaft 52 toward the piston rod 32 (leftward in the drawing) using an elastic force. The spring load of the spring 70 is set to be smaller than the spring load of the return spring 42. In the electromagnetic unit 50, terminals from the coil 64 are disposed in a connector portion (not illustrated) formed on the outer peripheral side of the yoke 60, and the coil 64 is energized via the terminals.

The yoke 60 is formed from a magnetic material, and includes an annular flange portion (projecting portion) 61 formed to project radially inward so as to have an inside diameter that is smaller than the inside diameter of the coil 64 and the outside diameter of the large diameter portion 57 of the solenoid shaft 52. A portion of the flange portion 61 on the radially inner side with respect to the inside diameter of the core 66 (a portion of the flange portion 61 that faces the large diameter portion 57 of the solenoid shaft 52 in the left-right direction in the drawing) attracts a magnetic body portion of the solenoid shaft 52 that is formed from a magnetic material through a magnetic force (formation of a magnetic circuit) when the coil 64 is energized, and thus will hereinafter be referred to as an "attracting portion 62".

The solenoid shaft 52 is disposed such that the distal end portion 54 (left end portion of the small diameter portion 53 in the drawing) of the solenoid shaft 52 faces about the right half, in the drawing, of the roller 48 of the pin 46 in the hole portion 36 of the piston rod 32 in the up-down direction in the drawing. A surface of the distal end portion 54 of the solenoid shaft 52 on the upper side in the drawing (unlock side) (a surface that abuts against the roller 48 to receive a force from the roller 48 during movement of the piston rod 32 toward the lower side in the drawing from the state of FIG. 3; hereinafter referred to as an "upper abutment surface 55") is formed to be inclined upward in the drawing at a constant angle from the distal end side toward the base end side (from the left side toward the right side in the drawing). A surface of the distal end portion 54 of the solenoid shaft 52 on the lower side in the drawing (lock side) (a surface that abuts against the roller 48 to receive a force from the roller 48 during movement of the piston rod 32 toward the upper side in the drawing from the state of FIG. 1 or that state; hereinafter referred to as a "lower abutment surface 56") is formed to be curved (arcuately curved as seen from the front side in the drawing) to be convex downward in the drawing from the distal end side toward the base end side with a radius of curvature that is smaller than the radius of curvature of the roller 48.

In addition, the solenoid shaft 52 is formed from a non-magnetic material for the small diameter portion 53 and a part of the large diameter portion 57 on the radially inner side, and the remainder of the large diameter portion 57 is formed from a magnetic material (which corresponds to the magnetic body portion discussed above). A surface of the large diameter portion 57 of the solenoid shaft 52 on the left side in the drawing is pressed against a surface of the attracting portion 62 of the yoke 60 on the right side in the drawing by the elastic force of the spring 70 when the distal end portion 54 of the solenoid shaft 52 is not in abutment with the roller 48 of the pin 46 of the piston rod 32 and the coil 64 is not energized (when the parking unlocked state is established by a hydraulic pressure). In the parking locked state, meanwhile, as illustrated in FIG. 1, the pin 46 of the piston rod 32 abuts against the distal end portion 54 of the solenoid shaft 52, and the large diameter portion 57 is located away from the attracting portion 62 (has been moved rightward in the drawing with respect to the state of FIG. 3). Therefore, in the state of FIG. 1, the spring 70 has been contracted compared to the state of FIG. 3.

The electromagnetic unit 50 is configured with the specifications of the coil 64 and the spring 70, the current for energizing the coil 64 (the magnitude of the attracting force of the attracting portion 62 of the yoke 60), and so forth adjusted such that when the coil 64 is energized, the solenoid shaft 52 is held on the left side in the drawing (on the piston rod 32 side) (movement of the solenoid shaft 52 toward the right side in the drawing (toward the side away from the piston rod 32) is restricted) with the attracting portion 62 of the yoke 60 attracting the large diameter portion 57 (in particular, the magnetic body portion) of the solenoid shaft 52 irrespective of whether or not a force is applied from the roller 48 of the pin 46 of the piston rod 32 to the distal end portion 54 (the upper abutment surface 55 or the lower abutment surface 56) of the solenoid shaft 52, and such that when the coil 64 is not energized, the solenoid shaft 52 is allowed to be moved rightward in the drawing by a force applied from the roller 48 of the piston rod 32 to the distal end portion 54 of the solenoid shaft 52 during movement of the piston rod 32.

In the parking device 20 according to the first embodiment configured as described above, the hydraulic unit 30 (such as the piston rod 32) and the electromagnetic unit 50 (such as the solenoid shaft 52) are disposed in directions that are orthogonal to each other. Thus, such components can be suitably disposed in a limited space compared to a configuration in which the two components are disposed on the same axis.

Figure 4:
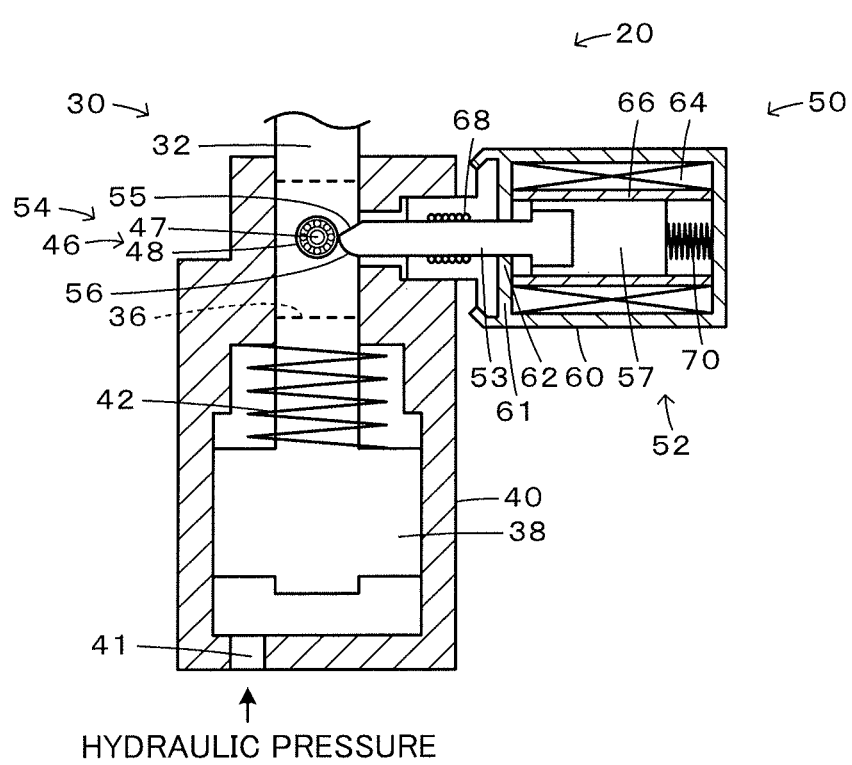
FIG. 4 illustrates a state in which the rightmost portion, in the drawing, of a roller 48 of a pin 46 of the piston rod 32 abuts against the distal end of a solenoid shaft 52.

Now, operation of the parking device 20 according to the first embodiment configured as described above will be described. First, switching from the parking locked state in FIG. 1 to the parking unlocked state in FIG. 3 is considered. In the parking locked state, as discussed above, the roller 48 of the pin 46 of the piston rod 32 and the lower abutment surface 56 of the distal end portion 54 of the solenoid shaft 52 are in abutment with each other. In this state, the coil 64 is not energized. When a hydraulic pressure that resists against the elastic force of the return spring 42 is applied to the piston 38 (piston rod 32) in this state, a force directed obliquely rightward and upward in the drawing (specifically, directed from a location of abutment of the lower abutment surface 56 which is arcuately curved with the roller 48 toward the center of a circle having the arc as a part of the circumference) is applied from the piston rod 32 (roller 48) to the solenoid shaft 52, and the piston rod 32 is moved upward in the drawing (toward the unlock side) while moving the solenoid shaft 52 rightward in the drawing (toward the side away from the piston rod 32) using a component of the force in the left-right direction in the drawing. Then, after the piston rod 32 is moved to a position at which the rightmost portion, in the drawing, of the roller 48 of the piston rod 32 and the distal end (leftmost portion in the drawing) of the solenoid shaft 52 abut against each other as illustrated in FIG. 4, the piston rod 32 is moved upward in the drawing while the solenoid shaft 52 is returned leftward in the drawing (toward the piston rod 32)

by the elastic force of the spring 70. Then, the piston rod 32 is moved to a position at which the roller 48 is not in contact with the distal end portion 54 of the solenoid shaft 52 as illustrated in FIG. 3. Switching to the parking unlocked state is performed in this way. In the first embodiment, in the parking locked state, the pin 46 of the piston rod 32 and the lower abutment surface 56 of the distal end portion 54 of the solenoid shaft 52 are in abutment with each other. Thus, it is possible to reduce the amount of movement of the piston rod 46 toward the upper side in FIG. 1 (unlock side) required to establish the parking unlocked state and to suppress a collision between the pin 46 and the lower abutment surface 56 compared to a configuration in which the two components are not in abutment with each other (the pin 46 is positioned slightly away on the lower side in FIG. 1 (lock side) from the lower abutment surface 56). In the parking locked state, in addition, the pin 46 of the piston rod 32 abuts against the distal end portion 54 of the solenoid shaft 52, and the large diameter portion 57 of the solenoid shaft 52 is located away from the attracting portion 62 of the yoke 60 (the solenoid shaft 52 has been moved rightward in FIG. 1 with respect to the state of FIG. 3). Thus, it is possible to reduce the amount of movement to be made before the piston rod 32 is moved upward in the drawing to reach the state of FIG. 4, and hence to reduce the amount of movement required to establish the parking unlocked state. In the first embodiment, in addition, the roller 48 which is rotatable with respect to the piston rod 32 (support shaft 47) is used as the abutment portion of the piston rod 32. Thus, the frictional resistance generated when the roller 48 of the piston rod 32 and the distal end portion 54 of the solenoid shaft 52 abut against each other can be reduced, which makes it possible to suppress wear of such components and to make movement of the piston rod 32 and the solenoid shaft 52 smoother. Further, the piston rod 32 is held by the bearing member 68. Thus, the sliding resistance of the solenoid shaft 52 can be reduced, which makes it possible to make movement of the solenoid shaft 52 smoother. Additionally, the lower abutment surface 56 is formed as a curved surface with a radius of curvature that is smaller than the radius of curvature of the roller 48. Thus, a force toward the right side in the drawing applied to the solenoid shaft 32 along with movement of the piston rod 32 toward the upper side in the drawing tends to be large. Thus, the piston rod 32 can be moved upward in the drawing while moving the solenoid shaft 52 rightward in the drawing even when the hydraulic pressure is more or less low.

Figure 5:
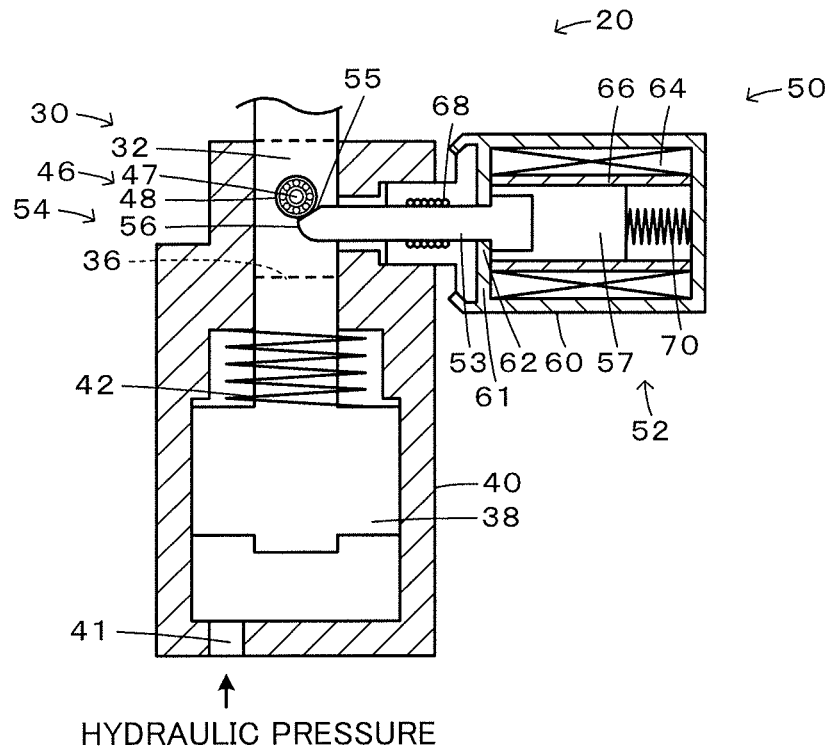
FIG. 5 illustrates a state in which the parking unlocked state is held by energizing a coil 64 when a hydraulic pressure for a piston 38 is low.

When the parking unlocked state is thus established by a hydraulic pressure, energization of the coil 64 is started before a hydraulic pressure for the piston 38 is reduced (e.g. before an engine-driven mechanical pump that generates the hydraulic pressure is stopped by idle stop). Consequently, the solenoid shaft 52 is held (movement of the solenoid shaft 52 is restricted) with a relatively large holding force with the attracting portion 62 attracting the large diameter portion 57 (in particular, the magnetic body portion) of the solenoid shaft 52. Thus, the piston rod 32 is held in position with the roller 48 of the pin 46 of the piston rod 32 in abutment with the upper abutment surface 55 of the distal end portion 54 of the solenoid shaft 52 as illustrated in FIG. 5 when a hydraulic pressure for the piston 38 is reduced thereafter (e.g. when idle stop is performed), although the piston rod 32 is moved downward in the drawing (toward the lock side) by the elastic force of the return spring 42. Consequently, the parking unlocked state can be held even when a hydraulic pressure for the piston 38 is reduced. In the electromagnetic unit 50 according to the first embodiment, moreover, the solenoid shaft 52 is attracted toward the attracting portion 62 to be held when the coil 64 is energized. Thus, the desired magnetic flux can be reduced compared to a configuration in which the solenoid shaft 52 is moved in the second direction (left-right direction in the drawing). As a result, the number of turns of the coil 64 required to obtain the desired magnetic flux can be reduced, which makes it possible to downsize the coil 64 and hence the electromagnetic unit 50.

When a hydraulic pressure is reduced from a state (see FIG. 3) in which the parking unlocked state is established (held) by the hydraulic pressure with the coil 64 not energized (e.g. when the shift position is changed to the parking position during operation of the engine), or when energization of the coil 64 is ended from a state (see FIG. 5) in which the parking unlocked state is held with the hydraulic pressure reduced and with the coil 64 energized (e.g. when the shift position is changed to the parking position during idle stop), a force directed obliquely rightward and downward in the drawing (specifically, a direction that is perpendicular to the upper abutment surface 55 which is inclined at a constant angle) is applied from the piston rod 32 (roller 48) to the solenoid shaft 52 by the elastic force of the return spring 42 when the roller 48 of the pin 46 of the piston rod 32 and the upper abutment surface 55 of the distal end portion 54 of the solenoid shaft 52 abut against each other, and the piston rod 32 is moved downward in the drawing (toward the lock side) while moving the solenoid shaft 52 rightward in the drawing (toward the side away from the piston rod 32) using a component of the force in the left-right direction in the drawing. Then, after the piston rod 32 is moved to a position at which the rightmost portion, in the drawing, of the roller 48 of the piston rod 32 and the distal end (leftmost portion in the drawing) of the solenoid shaft 52 abut against each other, the piston rod 32 is moved downward in the drawing while the solenoid shaft 52 is returned leftward in the drawing (toward the piston rod 32) by the elastic force of the spring 70. Then, the piston rod 32 is stopped in a range in which the roller 48 abuts against the lower abutment surface 56 of the distal end portion 54 of the solenoid shaft 52 as illustrated in FIG. 1. Switching to the parking locked state is performed in this way. Thus, the parking locked state can be established more adequately when a hydraulic pressure that resists against the elastic force of the return spring 42 is not applied to the piston rod 32 with the coil 64 not energized (including an occasion in which the coil 64 cannot be energized for some reason). With the roller 48 and the bearing member 68, in addition, it is possible to suppress wear of the roller 48 of the piston rod 32 and the distal end portion 54 of the solenoid shaft 52 and to make movement of the piston rod 32 and the solenoid shaft 52 smoother as in switching from the parking locked state to the parking unlocked state discussed above.

In the parking device 20 according to the first embodiment described above, in the parking locked state, the roller 48 of the pin 46 of the piston rod 32 and the lower abutment surface 56 of the distal end portion 54 of the solenoid shaft 52 are in abutment with each other. Consequently, it is possible to reduce the amount of movement of the piston rod 46 toward the unlock side and to suppress a collision between the roller 48 and the lower abutment surface 56 when switching is performed to the parking unlocked state compared to a configuration in which the two components are not in abutment with each other. When a hydraulic pressure for the piston 38 is reduced with the coil 64 not energized in the parking unlocked state, meanwhile, the piston rod 32 is moved toward the lock side while moving the solenoid shaft 52 away from the piston rod 32 through abutment between the roller 48 of the piston rod 32 and the distal end portion 54 of the solenoid shaft 52. Consequently, the parking locked state can be established more adequately when a hydraulic pressure that resists against the elastic force of the return spring 42 is not applied to the piston rod 32 with the coil 64 not energized (including an occasion in which the coil 64 cannot be energized for some reason). Originally, the hydraulic unit 30 (in particular, the piston rod 32) and the electromagnetic unit 50 (in particular, the solenoid shaft 52) are disposed in directions that are orthogonal to each other. Thus, such components can be suitably disposed in a limited space compared to a configuration in which the two components are disposed on the same axis.

In the parking device 20 according to the first embodiment, in the parking locked state, the roller 48 of the pin 46 of the piston rod 32 abuts against the distal end portion 54 of the solenoid shaft 52, and the large diameter portion 57 of the solenoid shaft 52 is located away from the attracting portion 62 of the yoke 60 (the solenoid shaft 52 has been moved rightward in FIG. 1 with respect to the state of FIG. 3). However, the roller 48 of the piston rod 32 may abut against the distal end portion 54 of the solenoid shaft 52 to such a degree that the large diameter portion 57 of the solenoid shaft 52 is not moved away from the attracting portion 62 of the yoke 60 (to such a degree that the solenoid shaft 52 is not moved rightward in FIG. 1 with respect to the state of FIG. 3).

In the parking device 20 according to the first embodiment, the roller 48 which is rotatable with respect to the piston rod 32 (support shaft 47) is used as the abutment portion of the piston rod 32. However, a component that is not rotatable with respect to the piston rod 32 (e.g. a component that is similar to the support shaft 47) may also be used. In this case, the frictional resistance between the abutment portion of the piston rod 32 and the distal end portion 54 of the solenoid shaft 52 generated when the two components abut against each other is increased. Thus, movement of the piston rod 32 and movement of the solenoid shaft 52 may be less smooth when switching is performed between the parking locked state and the parking unlocked state, but the parking unlocked state can be held more easily by energizing the coil 64.

In the parking device 20 according to the first embodiment, the electromagnetic unit 50 includes the bearing member 68 which slidably supports the small diameter portion 53 of the solenoid shaft 52. However, the bearing member 68 may not be provided.

Figure 6:
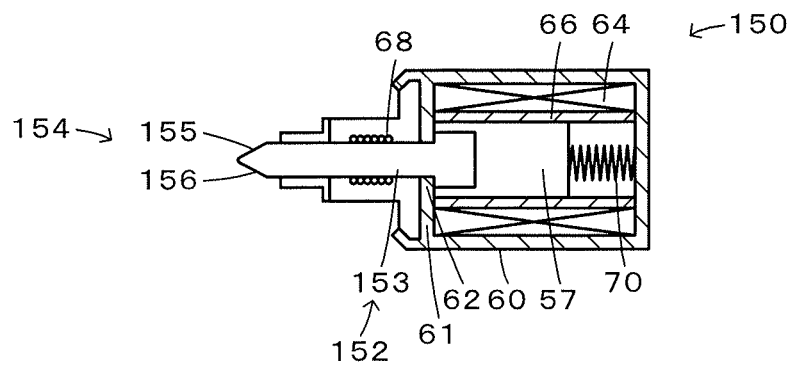
FIG. 6 is a diagram illustrating a schematic configuration of an electromagnetic unit 150 according to a modification.

In the parking device 20 according to the first embodiment, the lower abutment surface 56 of the distal end portion 54 of the solenoid shaft 52 is formed as a curved surface that is convex downward in the drawing from the distal end side toward the base end side and that has a radius of curvature that is smaller than the radius of curvature of the roller 48 of the pin 46. However, the lower abutment surface 56 may be formed as a curved surface that has a radius of curvature that is about the same as or larger than the radius of curvature of the roller 48. Alternatively, as illustrated in FIG. 6 which illustrates an electromagnetic unit 150 according to a modification, a lower abutment surface 156 of a distal end portion 154 of a small diameter portion 153 of a solenoid shaft 152 may be formed to be inclined downward in the drawing at a constant angle from the distal end side toward the base end side.

In the parking device 20 according to the first embodiment, the upper abutment surface 55 of the distal end portion 54 of the solenoid shaft 52 is formed to be inclined upward in FIGS. 1 and 3 (toward the unlock side) at a constant angle from the distal end side toward the base end side. However, the inclination angle is not limited to a constant angle, and the upper abutment surface 55 may be formed to be inclined at angles that vary smoothly.

In the parking device 20 according to the first embodiment, when a hydraulic pressure for the piston 38 is reduced with the coil 64 not energized in the parking unlocked state, the piston rod 32 is moved downward in FIG. 3 (toward the lock side) by the elastic force of the return spring 42. At this time, working oil may be supplied to a closed space formed by the piston 38 and the case 40 (a closed space in which the return spring 42 is disposed) via a working oil inlet/discharge hole (not illustrated) formed in the case 40. With this configuration, the piston rod 32 can be moved downward in FIG. 3 more immediately by the elastic force of the return spring 42 and a hydraulic pressure.

Figure 7:
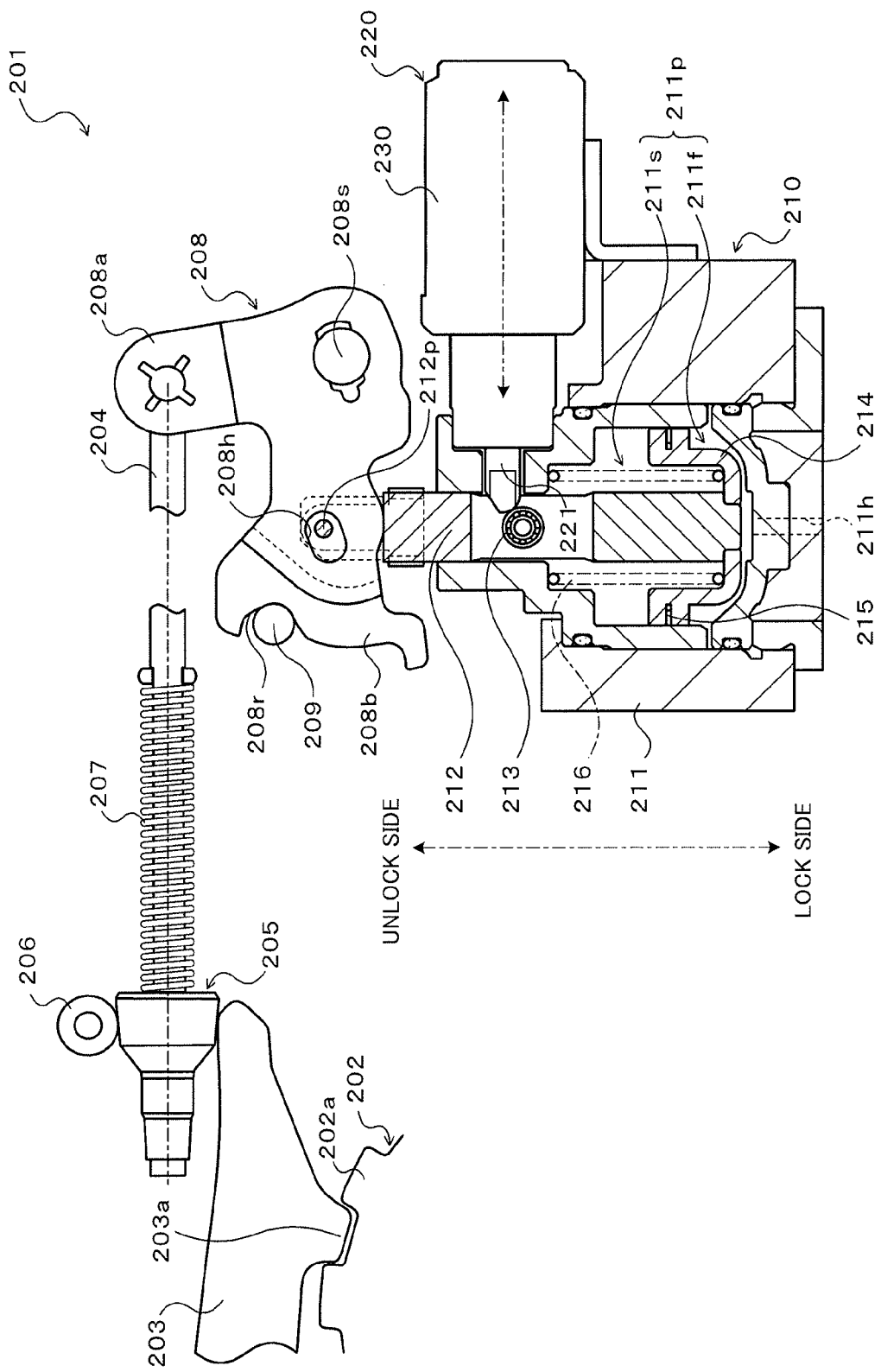
FIG. 7 is a diagram illustrating a schematic configuration of a parking device 201 according to a second embodiment of the present disclosure.
Figure 8:
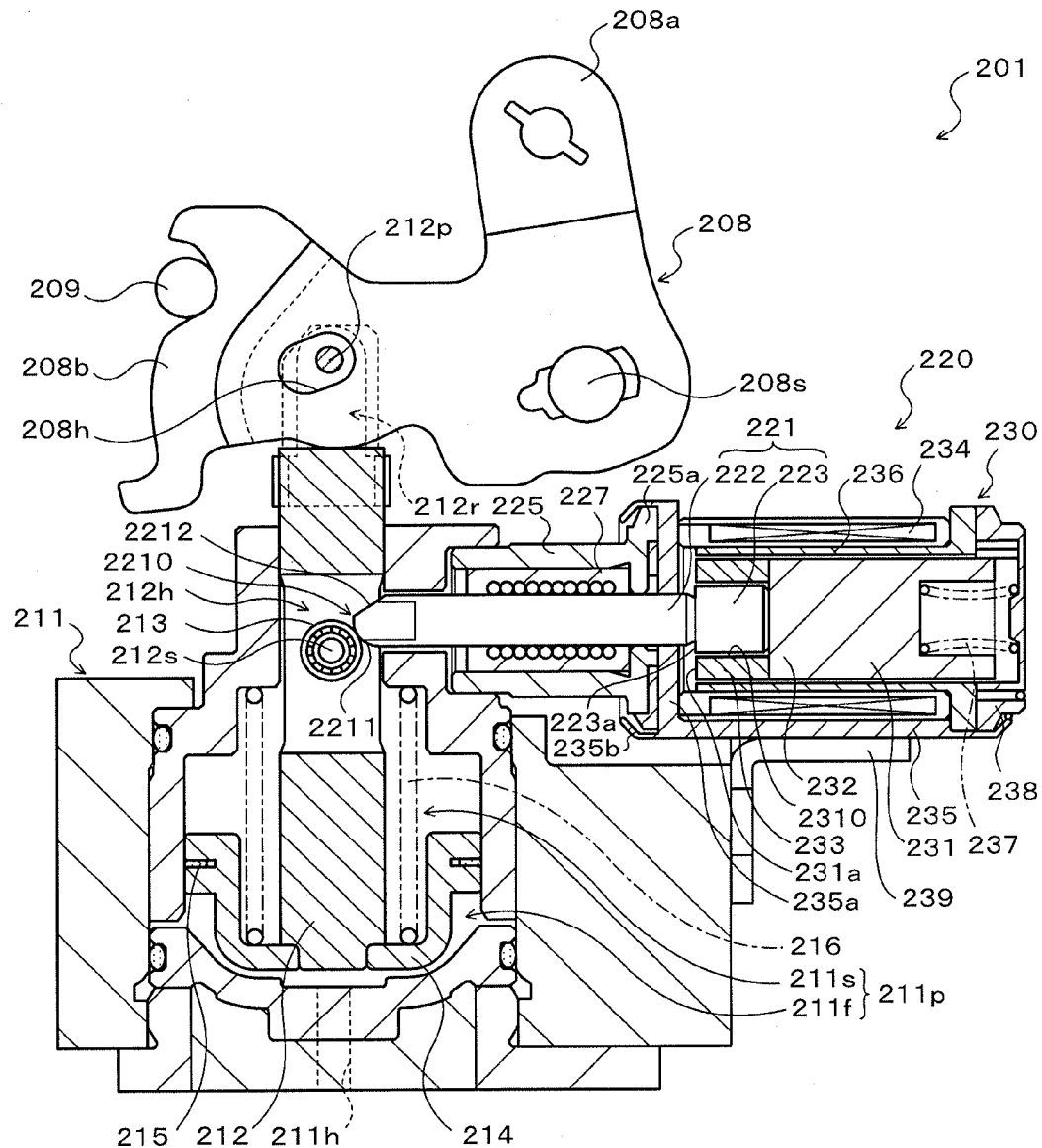
FIG. 8 is a diagram illustrating a schematic configuration of an essential portion of the parking device 201.
Figure 9:
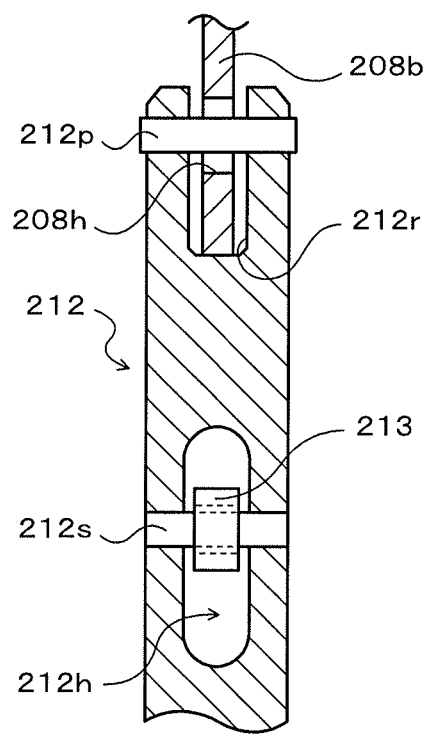
FIG. 9 is a diagram illustrating a schematic configuration of a part of a hydraulic unit 210.
Figure 10:
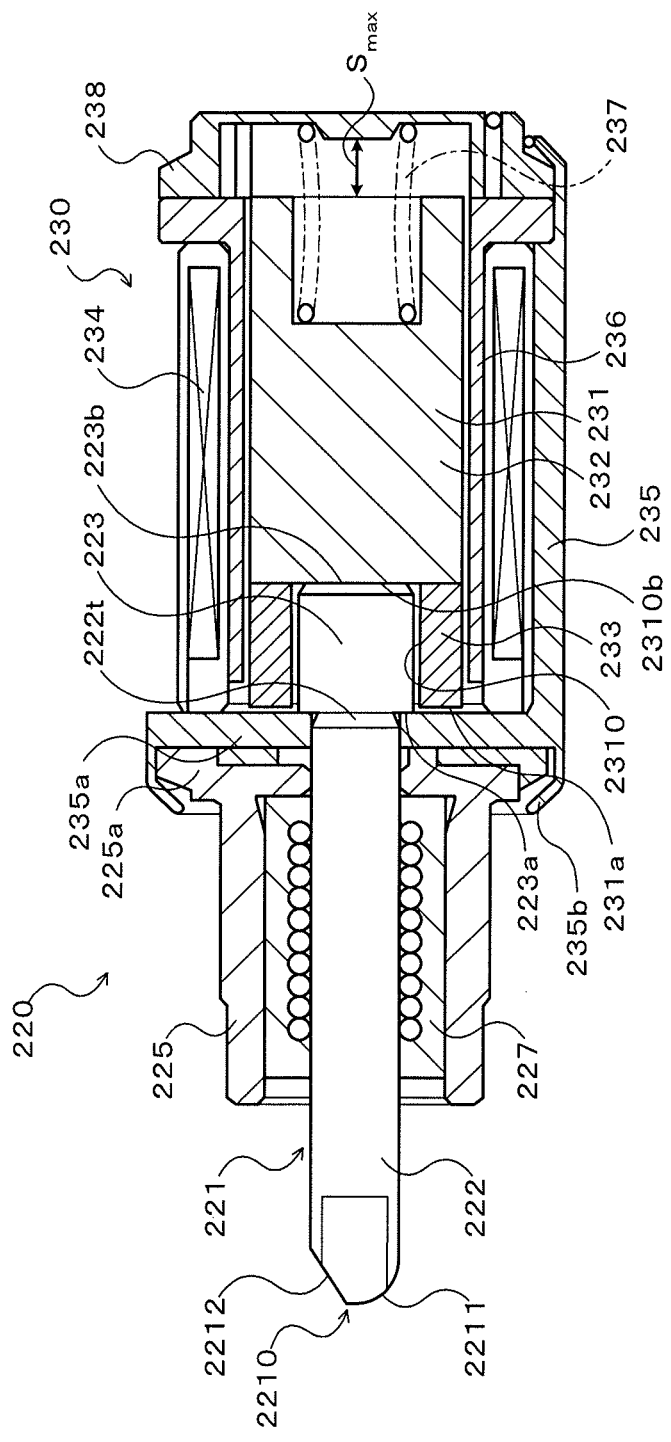
FIG. 10 is a diagram illustrating a schematic configuration of an electromagnetic unit 220.
Figure 11:
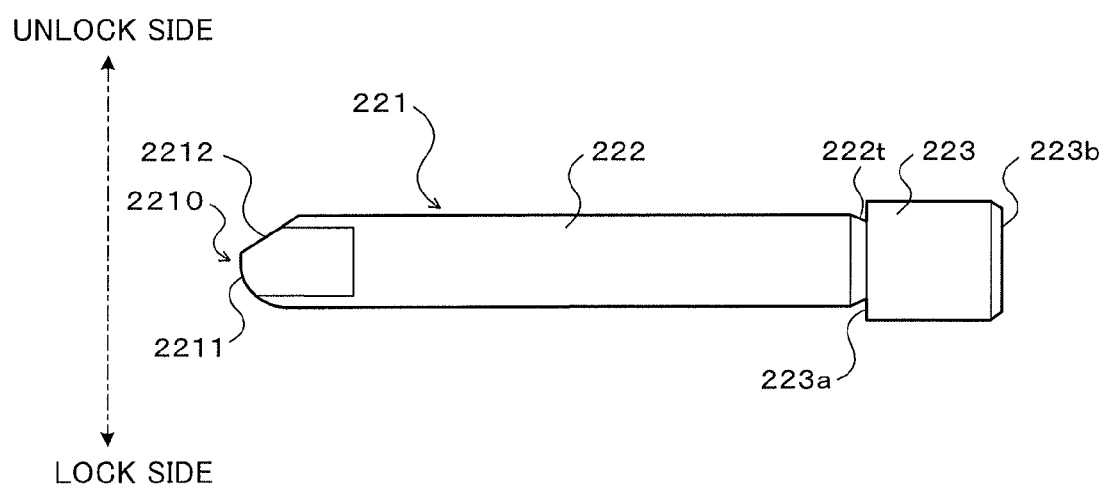
FIG. 11 is a diagram illustrating a schematic configuration of a lock shaft 221.

FIG. 7 is a diagram illustrating a schematic configuration of a parking device 201 according to a second embodiment of the present disclosure. FIG. 8 is a diagram illustrating a schematic configuration of an essential portion of the parking device 201. FIG. 9 is a diagram illustrating a schematic configuration of a part of a hydraulic unit 210. FIG. 10 is a diagram illustrating a schematic configuration of an electromagnetic unit 220. FIG. 11 is a diagram illustrating a schematic configuration of a lock shaft 221 of the electromagnetic unit 220.

The parking device 201 according to the second embodiment is mounted on a vehicle, and disposed inside or outside a transmission case of a transmission (not illustrated). The parking device 201 is configured as a so-called shift-by-wire parking device that locks and unlocks a rotary shaft of the transmission on the basis of an electric signal output in accordance with the operation position (shift range) of a shift lever (not illustrated).

As illustrated in FIG. 7, the parking device 201 includes: a parking gear 202 having a plurality of teeth 202a and attached to a rotary shaft of the transmission; a parking pawl 203 having a projected portion 203a that is engageable with the parking gear 202 and urged to be spaced from the parking gear 202 by a spring (not illustrated); a parking rod 204 that is advanceable and retractable; a tubular cam member 205 that is movable in the axial direction of the parking rod 204; a support roller 206 rotatably supported by the transmission case, for example, to interpose the cam member 205 together with the parking pawl 203; a cam spring 207, one end of which is supported by the parking rod 204 and which urges the cam member 205 so as to press the parking pawl 203 against the parking gear 202; a detent lever 208 coupled to the parking rod 204; the hydraulic unit 210 which advances and retracts the parking rod 204 via the detent lever 208 through movement of a piston rod 212; and the electromagnetic unit (magnetic unit) 220 which restricts movement of the piston rod 212 to restrict advancement and retraction of the parking rod 204. In the parking device 201, as illustrated in the drawing, the projected portion 203a of the parking pawl 203 engages with a recessed portion between two adjacent teeth 202a of the parking gear 202 to lock the rotary shaft of the transmission (parking lock is performed).

The parking gear 202, the parking pawl 203, the parking rod 204, the cam member 205, the support roller 206, and the cam spring 207 all have well-known configurations. The detent lever 208 is generally formed in an L-shape, and includes a first free end portion 208a and a second free end portion 208b. The first free end portion 208a is rotatably coupled to a base end portion (right end portion in FIG. 7)

of the parking rod 204. The second free end portion 208b is formed with an engagement recessed portion 208r that is engageable with an engagement member 209 attached to a detent spring (not illustrated) supported by the transmission case, for example. A corner portion of the detent lever 208 (base end portion of the first and second free end portions 208a and 208b) is turnably supported by a support shaft 208s supported by the transmission case, for example.

The hydraulic unit 210 is configured to operate in accordance with a hydraulic pressure from a hydraulic control device of the transmission controlled by an electronic control device on the basis of an electric signal output in accordance with the operation position (shift range) of the shift lever. As illustrated in FIG. 8, the hydraulic unit 210 includes: a case 211 composed of a plurality of members; the piston rod 212 which serves as a first shaft member coupled to the second free end portion 208b of the detent lever 208 and supported by the case 211 so as to be movable in the axial direction (up-down direction in FIG. 8 (first direction)); and a piston 214 fixed to the piston rod 212 and disposed in a piston chamber 211p formed in the case 211.

The piston rod 212 is supported by the case 211 such that the distal end portion (upper end portion in FIG. 8) of the piston rod 212 projects out of the case 211. As illustrated in FIG. 9, a coupling recessed portion 212r that extends from the distal end side toward the base end side is formed at the distal end portion of the piston rod 212, and the second free end portion 208b of the detent lever 208 is inserted into the coupling recessed portion 212r. The detent lever 208 is formed with a long hole 208h positioned in the coupling recessed portion 212r. A coupling pin 212p supported by the distal end portion of the piston rod 212 is inserted through the long hole 208h. The long hole 208h is formed with a space defined between the inner periphery of the long hole 208h and the outer peripheral surface of the coupling pin 212p. Consequently, the piston rod 212 and the detent lever 208 are coupled so as to allow some relative movement with respect to each other.

In addition, a hole portion 212h that penetrates through the piston rod 212 in a direction (left-right direction in FIG. 8) that is orthogonal to the axial direction and that extends in the axial direction is formed around the center portion of the piston rod 212 in the axial direction. A roller 213 that serves as an abutment portion is disposed inside the hole portion 212h. The roller 213 is constituted as a roller bearing, and has an outside diameter that is smaller than the length of the hole portion 212h in the longitudinal direction (up-down direction in FIGS. 8 and 9). The roller 213 is rotatably supported in the hole portion 212h by a support shaft 212s supported by the piston rod 212 so as to extend in parallel with the coupling pin 212p.

The piston 214 is fixed to the base end portion (lower end portion in FIG. 8) of the piston rod 212, and supported by the inner wall surface of the piston chamber 211p via a seal member 215 so as to be movable in the axial direction of the piston rod 212. The piston 214 partitions the inside of the piston chamber 211p into an oil chamber 211f and a spring chamber 211s. The oil chamber 211f is defined on the lower side, in FIG. 8, of the piston chamber 211p to be spaced from the distal end portion (upper end portion in FIG. 8) of the piston rod 212 and the detent lever 208, and communicates with a working oil inlet/discharge hole (oil hole) 211h formed in the case 211. A hydraulic pressure (working oil) from the hydraulic control device is supplied into the oil chamber 211f via an oil passage (not illustrated) and the working oil inlet/discharge hole 211h. In addition, the spring chamber 211s is defined on the upper side, in FIG. 8, of the piston chamber 211p in proximity to the distal end portion of the piston rod 212 and the detent lever 208. A return spring 216 that serves as an elastic member is disposed in the spring chamber 211s so as to be positioned between the case 211 and the piston 214. The piston 214 is urged from the spring chamber 211s side toward the oil chamber 211f (downward in the drawing) by the return spring 216.

With the hydraulic unit 210 configured as described above in an assembled state (a state in which assembly has been completed), the piston 214 is urged downward in FIG. 7 by the return spring 216 to approach the bottom portion of the oil chamber 211f the most, and the amount of projection of the piston rod 212 from the case 211 becomes the smallest. Consequently, the parking rod 204 which is coupled to the piston rod 212 via the detent lever 208 approaches the base end portion of the parking pawl 203 the most, and the parking pawl 203 is pressed by the cam member 205, which is urged by the cam spring 207, so as to engage with the parking gear 202, which locks the rotary shaft of the transmission (parking lock is performed).

When a hydraulic pressure from the hydraulic control device is supplied to the oil chamber 211f of the hydraulic unit 210 in a state (hereinafter referred to as appropriate as a "parking locked state") in which the rotary shaft of the transmission is locked as illustrated in FIG. 7, the piston 214 is moved upward in FIG. 7 (hereinafter referred to as appropriate as an "unlock side") in the moving direction (first direction) of the piston rod 212 by a hydraulic pressure in the oil chamber 212f against the elastic force (urging force) of the return spring 216. Consequently, the piston rod 212 which is fixed to the piston 214 is also moved toward the unlock side, along with which the detent lever 208 is turned clockwise in FIG. 7 about the support shaft 208s and the parking rod 204 is moved rightward in FIG. 7. Then, when the parking rod 204 is moved rightward in FIG. 7, pressing of the parking pawl 203 by the cam member 205 is released, and engagement between the parking gear 202 and the parking pawl 203, that is, lock of the rotary shaft of the transmission, is released (parking lock is released). Thus, when a hydraulic pressure from the hydraulic control device is supplied to the oil chamber 211f of the hydraulic unit 210 during travel of the vehicle, the rotary shaft of the transmission is not locked (parking lock is not performed).

Meanwhile, when supply of a hydraulic pressure from the hydraulic control device to the working oil inlet/discharge hole 211h is stopped and working oil flows out of the oil chamber 211f via the working oil inlet/discharge hole 211h in a state (hereinafter referred to as appropriate as a "parking unlocked state") in which parking lock is released, the piston 214 is moved downward in FIG. 7 (hereinafter referred to as appropriate as a "lock side") in the moving direction of the piston rod 212 by the elastic force of the return spring 216. Consequently, the piston rod 212 which is fixed to the piston 214 is also moved toward the lock side, along with which the detent lever 208 is turned counterclockwise in FIG. 7 about the support shaft 208s and the parking rod 204 is moved leftward in FIG. 7. Then, when the parking rod 204 is moved leftward in FIG. 7, the parking pawl 203 is pressed by the cam member 205, which is urged by the cam spring 207, so as to engage with the parking gear 202, which locks the rotary shaft of the transmission (parking lock is performed). With the engagement recessed portion 208r of the second free end portion 208b of the detent lever 208 and the engagement member 209 engaging with each other, turning of the detent lever 208 about the support shaft 208s is restricted to some degree by a detent spring (not illustrated), and accordingly movement of the parking rod 204 is also restricted to some degree.

The electromagnetic unit 220 is used to restrict movement of the piston rod 212 toward the lock side by the elastic force (urging force) of the return spring 216 to prevent a transition from the parking unlocked state to the parking locked state when a hydraulic pressure supplied to the oil chamber 211f of the hydraulic unit 210 is reduced as the engine of the vehicle and an oil pump driven by the engine are stopped by idle stop or the like, for example.

As illustrated in FIG. 10, the electromagnetic unit 220 includes: the lock shaft 221 having a distal end portion 2210 that can abut against the roller 213 (see FIG. 8) which serves as an abutment portion provided to the piston rod 212; a shaft holder 225 that supports the lock shaft 221 so as to be movable in the axial direction (left-right direction in FIG. 10 (second direction)); and a magnetic portion 230 that can lock the lock shaft 221 using a magnetic force.

The lock shaft 221 is formed from a non-magnetic body such as stainless steel. As illustrated in FIGS. 10 and 11, the lock shaft 221 includes a small diameter portion 222 having a distal end portion 2210, and an expanded diameter portion 223 that extends from the small diameter portion 222 toward a side that is opposite to the distal end portion 2210 and that is larger in diameter than the small diameter portion 222. The small diameter portion 222 is formed in a generally circular column shape with the distal end portion 2210 shaped to have a width across flat shape. The expanded diameter portion 223 is formed in a generally circular column shape, and includes an annular end surface 223a on the small diameter portion 222 side and a flat end surface 223b on a side that is opposite to the small diameter portion 222 side. A tapered portion 222t is formed on the outer peripheral surface of the small diameter portion 222 around the boundary between the small diameter portion 222 and the expanded diameter portion 223. The tapered portion 222t is formed such that the outer peripheral surface of the small diameter portion 222 is tapered (becomes smaller in outside diameter) from the distal end portion 2210 side toward the end surface 223a of the expanded diameter portion 223 around the boundary with the expanded diameter portion 223.

The distal end portion 2210 of the small diameter portion 222 has a lower abutment surface 2211 positioned on the lock side (lower side in the drawing) in the moving direction of the piston rod 212 (up-down direction in FIGS. 10 and 11), and an upper abutment surface 2212 positioned on the unlock side (upper side in the drawing) in the moving direction of the piston rod 212. The lower abutment surface 2211 is formed to be inclined toward the lock side from the distal end portion 2210 side toward the expanded diameter portion 223 side. Specifically, the lower abutment surface 2211 is formed as a curved surface that has a radius of curvature that is smaller than the radius (radius of curvature) of the outer peripheral surface of the roller 213 and that is convex toward the lock side and arcuate in section. The upper abutment surface 2212 is formed to be inclined toward the unlock side from the distal end portion 2210 side toward the expanded diameter portion 223 side. Specifically, the upper abutment surface 2212 is formed as an (flat) inclined surface that is inclined toward the unlock side at a constant angle.

As illustrated in FIG. 10, the shaft holder 225 is formed from a non-magnetic body such as aluminum generally in a bottomed cylindrical shape, and held by the magnetic portion 230. A hole for insertion of the small diameter portion 222 of the lock shaft 221 is formed in the bottom portion of the shaft holder 225. The distal end portion 2210 of the small diameter portion 222 of the lock shaft 221 projects leftward in the drawing from the shaft holder 225. In addition, a bearing member (linear motion bearing) 227 that slidably supports the outer peripheral surface of the small diameter portion 222 is fixed inside the shaft holder 225. By supporting the small diameter portion 222 using the bearing member 227 in this way, it is possible to smoothly move the lock shaft 221 in the axial direction while suppressing rattle of the lock shaft 221. Further, an annular flange portion 225a that projects radially outward is formed at the right end portion of the shaft holder 225 in the drawing.

As illustrated in FIG. 10, the magnetic portion 230 includes: a shaft moving member 231 that is movable in the axial direction (left-right direction in the drawing (second direction)) together with the lock shaft 221; a coil 234 disposed so as to surround the outer periphery of the shaft moving member 231; a yoke 235 that functions as a case that holds the shaft holder 225 and that houses the shaft moving member 231 and the coil 234; a core 236 disposed between the shaft moving member 231 and the coil 234; and a spring 237 that serves as an elastic member that urges the shaft moving member 231 toward the shaft holder 225 (leftward in the drawing) using an elastic force.

The shaft moving member 231 includes a plunger 232 formed from a magnetic body such as iron, and an annular permanent magnet 233 having the same outside diameter as that of the plunger 232 and fixed to one end side (left end side in the drawing) of the plunger 232 in the axial direction (constituted integrally with the plunger 232). The permanent magnet 233 can be fixed to the plunger 232 easily and accurately by bonding or integral molding. The shaft moving member 231 has a recessed portion 2310 formed on one end side in the axial direction, and a flat and annular end surface 231a provided around the recessed portion 2310. The end surface 231a is formed as an end surface of the permanent magnet 233 on one end side. The recessed portion 2310 is a circular hole portion that has a bottom surface 2310b extending in a direction that is orthogonal to the axial direction and an inner peripheral surface. The bottom surface 2310b is formed as an end surface of the plunger 232 on one end side. The inner peripheral surface is formed as the inner peripheral surface of the permanent magnet 233. The expanded diameter portion 223 of the lock shaft 221 is inserted into the recessed portion 2310 such that the end surface 223b of the expanded diameter portion 223 of the lock shaft 221 abuts against the bottom surface 2310b.

The depth of the recessed portion 2310 of the shaft moving member 231 (length of the permanent magnet 233 in the axial direction) is determined as a value that is slightly (e.g. by about 0.1 mm) smaller than the length of the expanded diameter portion 223 of the lock shaft 221 in the axial direction. Thus, the end surface 223a of the expanded diameter portion 223 of the lock shaft 221 which is inserted into the recessed portion 2310 projects outward (leftward in the drawing) with respect to the end surface 231a of the shaft moving member 231.

In addition, the inside diameter of the inner peripheral surface of the recessed portion 2310 of the shaft moving member 231 (inside diameter of the permanent magnet 233) is determined as a value that is slightly (e.g. by about 0.5 mm to 1 mm) larger than the outside diameter of the expanded diameter portion 223 of the lock shaft 221. Thus, a predetermined clearance is formed between the inner peripheral surface of the recessed portion 2310 (permanent magnet 233) and the outer peripheral surface of the expanded diameter portion 223 of the lock shaft 221 which is inserted into the recessed portion 2310. Consequently, even if the lock shaft 221 rattles in the radial direction, such rattle can be absorbed by the clearance between the outer peripheral surface of the expanded diameter portion 223 and the inner peripheral surface of the recessed portion 2310 to suppress rattle of the shaft moving member 231 in the radial direction. As a result, a magnetic gap between the shaft moving member 231 (plunger 232) and the core 236 can be reduced. In addition, as discussed above, the lock shaft 221 is formed from a non-magnetic body. Thus, leakage of magnetic flux from the electromagnetic unit 220 can be reduced. As a result, the magnetic efficiency can be enhanced while suppressing an increase in size of the magnetic portion 230. In the second embodiment, the difference between the length of the expanded diameter portion 223 in the axial direction and the depth of the recessed portion 2310 of the shaft moving member 231 (length of the permanent magnet 233 in the second direction) is determined as a value that is smaller than the clearance between the outer peripheral surface of the expanded diameter portion 223 and the inner peripheral surface of the recessed portion 2310 of the shaft moving member 231 (inner peripheral surface of the permanent magnet 233).

The coil 234 has terminals connected to a connector (not illustrated) attached to the yoke 235 which serves as a case. A current is applied to the coil 234 from a vehicle auxiliary battery (not illustrated) via a power supply circuit controlled by an electronic control device that controls the hydraulic control device or another electronic control device and the connector. The yoke 235 is formed in a generally cylindrical shape from a magnetic body such as iron. An annular flange portion 235a that projects radially inward and a holder holding portion 235b that holds the shaft holder 225 together with the left end surface of the flange portion 235a in the drawing are formed on one end side (left end side in the drawing) of the yoke 235. The inside diameter of the flange portion 235a is determined as a value that is smaller than the inside diameter of the permanent magnet 233 of the shaft moving member 231 and that enables the small diameter portion 222 of the lock shaft 221 to slide. That is, a portion of the flange portion 235a on the radially inner side with respect to the inside diameter of the core 236 faces the end surface 223a of the expanded diameter portion 223 of the lock shaft 221 on the small diameter portion 222 side and the permanent magnet 233 in the left-right direction in the drawing. When the coil 234 is not energized, the lock shaft 221 and the shaft moving member 231 (plunger 232) are urged (locked) together toward the shaft holder 225 (leftward in the drawing) by the attracting force between the permanent magnet 233 of the shaft moving member 231 and the flange portion 235a of the yoke 235. When the coil 234 is energized, the attraction between the permanent magnet 233 and the flange portion 235a is canceled by magnetic flux that passes through the yoke 235, the permanent magnet 233, the plunger 232, and the core 236. The lock shaft 221 is formed from a non-magnetic body. Thus, leakage of magnetic flux from the electromagnetic unit 220 can be reduced. The holder support portion 235b is formed so as to cover the outer periphery and the left end surface, in the drawing, of the flange portion 225a of the shaft holder 225.

The yoke 235 is supported (fixed to the case 211) by a support member 239 attached to the case 211. In addition, a rear cap 238 is mounted to the other end portion (right end portion in FIG. 10) of the yoke 235 so as to hold the coil 234 and the core 236. The spring 237 is disposed between an end portion (right end portion in the drawing) of the shaft moving member 231 on a side that is opposite to the recessed portion 2310 side and the rear cap 238. The spring 237 urges the lock shaft 221 and the shaft moving member 231, which are not fixed to each other, together toward the shaft holder 225 (leftward in the drawing). In addition, the spring 237 has a spring constant (rigidity) that is smaller than that of the return spring 216 of the hydraulic unit 210. Further, the sum (a leftward force, in the drawing, applied to the lock shaft 221 and the shaft moving member 231) of the attracting force between the permanent magnet 233 and the flange portion 235a of the yoke 235 and the elastic force of the spring 237 is determined to be larger than a rightward component (hereinafter referred to as a "return spring component"), in FIG. 10, of the force applied from the roller 213 to the upper abutment surface 2212 by the elastic force (a downward force in FIGS. 8 and 10) of the return spring 216 of the hydraulic unit 210 when the roller 213 of the piston rod 212 and the upper abutment surface 2212 of the lock shaft 221 abut against each other. Thus, the lock shaft 221 and the shaft moving member 231 (plunger 232) are not moved (are locked) toward the rear cap 238 (rightward in FIG. 10) by the return spring component when the coil 234 is not energized, but are moved together toward the rear cap 238 by the return spring component when the coil 234 is energized. In addition, when the coil 234 is not energized, a rightward component, in FIG. 8, of the force applied from the roller 213 to the distal end portion 2210 when the roller 213 of the piston rod 212 and the distal end portion 2210 (the lower abutment surface 2211 or the upper abutment surface 2212) of the lock shaft 221 abut against each other is applied to the lock shaft 221, the shaft moving member 231 which is pressed rightward in the drawing by the lock shaft 221, and the flange portion 235a of the yoke 235 which is attracted by the permanent magnet 233 of the shaft moving member 231. Therefore, if the yoke 235 is not fixed to the case 211 via the support member 239, a relatively large force may be applied between the holder support portion 235b of the yoke 235 and the flange portion 225a of the shaft holder 225 with the case 211 urged to move rightward in the drawing. In the second embodiment, in contrast, the yoke 235 is fixed to the case 211 via the support member 239. Thus, it is possible to suppress application of a large force between the holder support portion 235b and the flange portion 225a of the shaft holder 225, which protects the yoke 235 and the shaft holder 225 better.

A maximum stroke amount Smax (in the example of FIG. 10, the clearance between the right end surface of the shaft moving member 231 (plunger 232) and the inner bottom surface of the rear cap 238), in the axial direction, of the shaft moving member 231 (plunger 232) in the yoke 235 is determined as a value that is smaller than the length of the expanded diameter portion 223 of the lock shaft 221 in the axial direction. Consequently, the expanded diameter portion 223 can be prevented from slipping out of the recessed portion 2310 of the shaft moving member 231 during movement of the lock shaft 221 and the shaft moving member 231 in the axial direction (left-right direction in the drawing).

With the electromagnetic unit 220 configured as described above in an assembled state (a state in which assembly has been completed), that is, in a state before being attached to the hydraulic unit 210, the lock shaft 221 and the shaft moving member 231 are urged by the elastic force of the spring 237 (and the attracting force between the permanent magnet 233 and the flange portion 235a of the yoke 235) such that the bottom surface 2310b (an end surface of the plunger 232 on one end side) of the recessed portion 2310 of the shaft moving member 231 abuts against the end surface 223b of the expanded diameter portion 223 of the lock shaft 221, and such that the end surface 223a of the expanded diameter portion 223 abuts against the flange portion 235a of the yoke 235. At this time, a slight clearance is formed between the end surface 231a (an end surface of the permanent magnet 233 on one end side) around the recessed portion 2310 of the shaft moving member 231 and the flange portion 235a. This is because the depth of the recessed portion 2310 (length of the permanent magnet 233 in the axial direction) is slightly smaller than the length of the expanded diameter portion 223 in the axial direction as discussed above. Consequently, the lock shaft 221 and the shaft moving member 231 are urged together toward the piston rod 212 such that the end surface 223a of the expanded diameter portion 223 abuts against the flange portion 235a. Thus, it is possible to suppress rattle of the lock shaft 221 in the axial direction between the flange portion 235a and the bottom surface 2310b of the recessed portion 2310 with only the end surface 231a of the shaft moving member 231 in abutment with the flange portion 235a and without the end surface 223a of the expanded diameter portion 223 in abutment with the flange portion 235a. In addition, abutment of the permanent magnet 233 against the flange portion 235a along with movement of the shaft moving member 231 can be suppressed to protect the permanent magnet 233. In the second embodiment, moreover, the difference between the length of the expanded diameter portion 223 in the axial direction and the depth of the recessed portion 2310 of the shaft moving member 231 (length of the permanent magnet 233 in the second direction) is determined as a value that is smaller than the clearance between the outer peripheral surface of the expanded diameter portion 223 and the inner peripheral surface of the recessed portion 2310 of the shaft moving member 231 (inner peripheral surface of the permanent magnet 233). Consequently, the attracting force between the flange portion 235a and the permanent magnet 233 can be increased by reducing the clearance between the flange portion 235a and the permanent magnet 233 when the expanded diameter portion 223 and the flange portion 235a abut against each other while absorbing rattle of the lock shaft 221 in the radial direction. In addition, since the clearance between the flange portion 235a and the permanent magnet 233 is small, magnetic flux for canceling the attraction between the permanent magnet 233 and the flange portion 235a can be generated more efficiently when the coil 234 is energized.

In addition, the tapered portion 222t is formed on the small diameter portion 222 of the lock shaft 221 around the boundary with the expanded diameter portion 223. Thus, the range of abutment of the end surface 223a of the expanded diameter portion 223 against the flange portion 235a can be made as close as possible to the small diameter portion 222 side, which makes it possible to suppress an increase in outside diameter of the expanded diameter portion 223 to make the electromagnetic unit 220 compact.

As illustrated in FIGS. 7 and 8, the electromagnetic unit 220 is attached to the hydraulic unit 210 such that the axial direction (up-down direction in the drawing (see the dash-and-dot line in FIG. 7)) of the piston rod 212 of the hydraulic unit 210 and the axial direction (left-right direction in the drawing (see the dash-double-dot line in FIG. 7)) of the lock shaft 221 and the shaft moving member 231 are orthogonal to each other. Consequently, the hydraulic unit 210 and the electromagnetic unit 220 can be disposed easily in a limited space inside or outside the transmission case compared to a configuration in which the two components are disposed coaxially with each other.

When the electromagnetic unit 220 is attached to the case 211 of the hydraulic unit 210, the distal end portion 2210 (the lower abutment surface 2211 and the upper abutment surface 2212) of the lock shaft 221 overlaps at least a part of the outer peripheral surface of the roller 213 as seen in the axial direction of the piston rod 212 (as seen from the upper side or the lower side of FIG. 8). Then, in the second embodiment, as illustrated in FIG. 8, the electromagnetic unit 220 is attached to the case 211 of the hydraulic unit 210 such that the lower abutment surface 2211 of the distal end portion 2210 of the lock shaft 221 abuts against the outer peripheral surface of the roller 213 (the lower abutment surface 2211 receives a force from the roller 213). Consequently, a force (compelling force) in the axial direction of the lock shaft 221 is applied from the roller 213 of the piston rod 212 to the distal end portion 2210 (lower abutment surface 2211) of the lock shaft 221, and accordingly the lock shaft 221 and the shaft moving member 231 of the electromagnetic unit 220 are slightly moved toward the rear cap 238 (rightward in the drawing) against the elastic force of the spring 237. Thus, a slight clearance is formed between the end surface 223a of the expanded diameter portion 223 of the lock shaft 221 on the small diameter portion 222 side and the flange portion 235a of the yoke 235.

Now, operation of the parking device 201 and the electromagnetic unit 220 according to the second embodiment configured as described above will be described.

When a hydraulic pressure (working oil) from the hydraulic control device is not supplied to the oil chamber 211f of the hydraulic unit 210 and the coil 234 of the magnetic portion 230 of the electromagnetic unit 220 is not energized, the hydraulic unit 210 and the electromagnetic unit 220 are in the state illustrated in FIG. 8, and the rotary shaft of the transmission is locked by the parking device 201 (parking lock is performed). At this time, in the electromagnetic unit 220, the lock shaft 221 and the shaft moving member 231 are urged (locked) leftward in the drawing by the attracting force between the permanent magnet 233 of the shaft moving member 231 and the flange portion 235a of the yoke 235 and the elastic force of the spring 237. At this time, in addition, the roller 213 and the lower abutment surface 2211 of the distal end portion 2210 of the lock shaft 221 are in abutment with each other.

Then, when a transition is made from the parking locked state to the parking unlocked state when the vehicle starts to travel, a hydraulic pressure from the hydraulic control device is supplied to the oil chamber 211f of the hydraulic unit 210. At this time, in addition, energization of the coil 234 of the magnetic portion 230 is started. When energization of the coil 234 is started, the attraction between the permanent magnet 233 and the flange portion 235a of the yoke 235 is canceled by magnetic flux generated by the energization. Thus, the lock shaft 221 and the shaft moving member 231 are urged leftward in FIG. 8 by only the spring 237.

Figure 12:
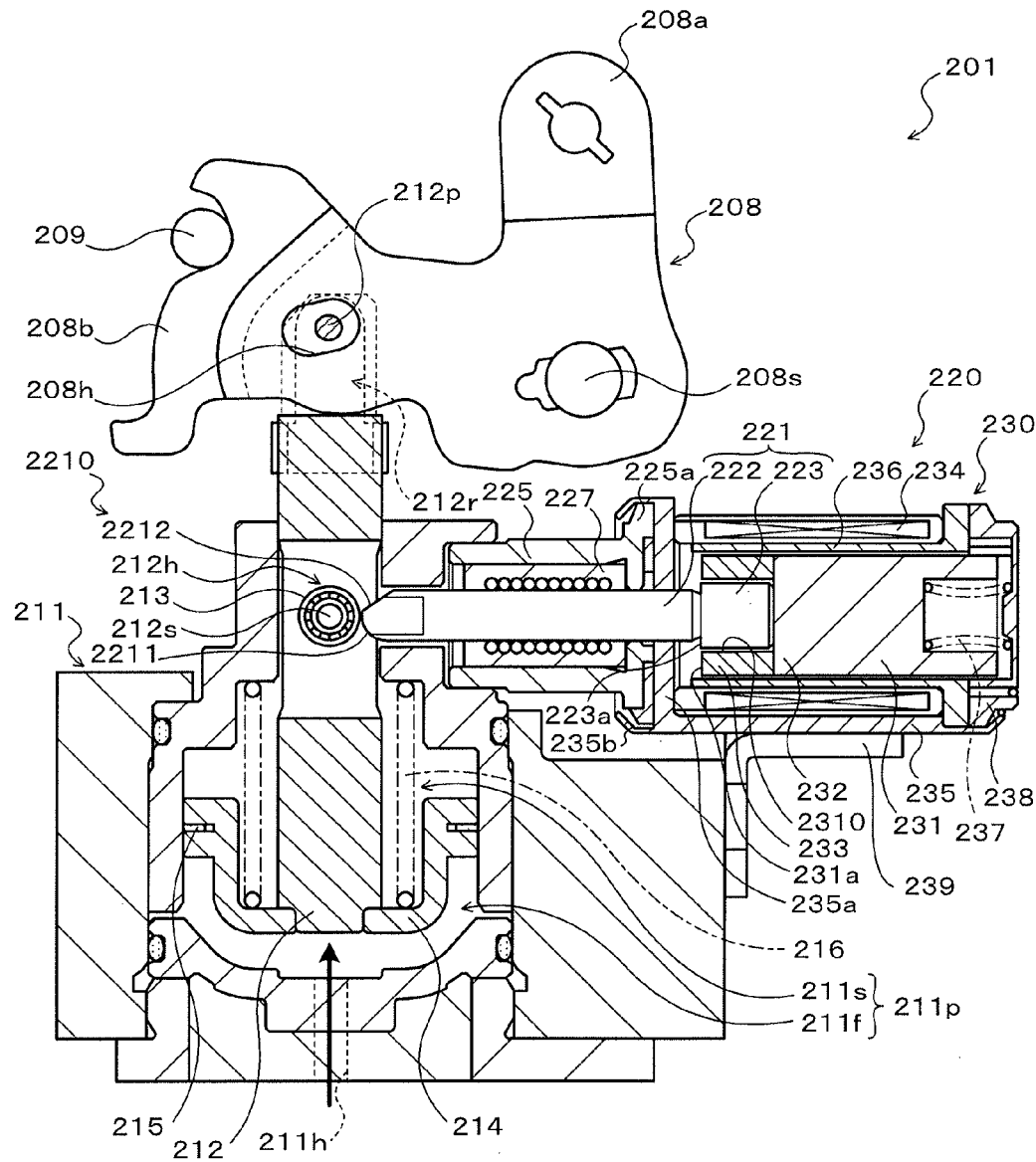
FIG. 12 illustrates operation of the parking device 201.

When a hydraulic pressure from the hydraulic control device is supplied to the oil chamber 211f of the hydraulic unit 210, the piston 214 and the piston rod 212 are moved toward the unlock side (upward in the drawing) against the elastic force of the return spring 216 by the hydraulic pressure in the oil chamber 211f as illustrated in FIG. 12. In the parking locked state, as discussed above, the roller 213 is in abutment with the lower abutment surface 2211 of the distal end portion 2210 of the lock shaft 221. Thus, when the piston rod 212 starts to move toward the unlock side, a force in a direction (direction of the normal) that is orthogonal to the direction of a tangent between the roller 213 and the lower abutment surface 2211 is applied from the piston rod 212 to the lock shaft 221 with the roller 213 rolling on the lower abutment surface 2211 of the lock shaft 221. Then, the lock shaft 221 and the shaft moving member 231 (the plunger 232 and the permanent magnet 233), which are not fixed to each other, are moved together toward the rear cap 238 (rightward in FIG. 12) by the force in the direction of the normal against the elastic force of the spring 237.

Figure 13:
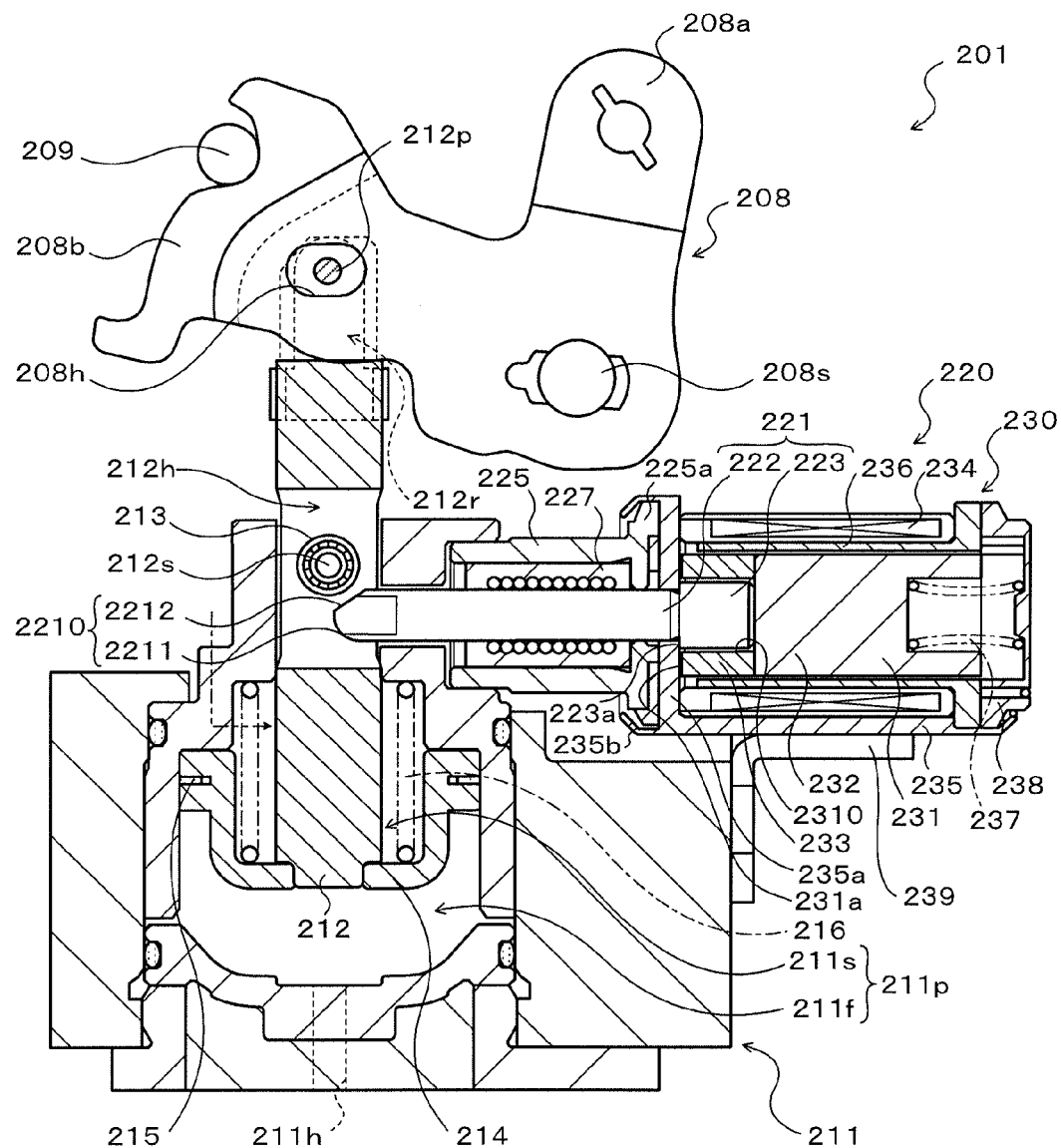
FIG. 13 illustrates operation of the parking device 201.

In addition, as illustrated in FIG. 12, when the roller 213 is moved away from the lower abutment surface 2211 of the lock shaft 221 along with movement of the piston rod 212 toward the unlock side, the lock shaft 221 and the shaft moving member 231 are urged by the spring 237 to be moved toward the deep side of the hole portion 212h (leftward in FIG. 12), and thereafter the roller 213 rolls on the upper abutment surface 2212 of the lock shaft 221. At this time, the roller 213 is moved toward the unlock side (upward in FIG. 12) together with the piston rod 212, and thus a force that moves the lock shaft 221 etc. toward the rear cap 238 is not applied from the roller 213 to the upper abutment surface 2212. After that, the piston rod 212 is further moved toward the unlock side by a hydraulic pressure, and stopped at a position at which a predetermined clearance is formed between the roller 213 and the upper abutment surface 2212 of the lock shaft 221 as illustrated in FIG. 13.

In this way, during a period since movement of the piston rod 212 toward the unlock side by a hydraulic pressure is started until such movement is stopped, the detent lever 208 is turned clockwise in FIG. 7 about the support shaft 208s, and the parking rod 204 is moved rightward in FIG. 7. Consequently, pressing of the parking pawl 203 by the cam member 205 is released along with movement of the parking rod 204, which releases parking lock. When the parking unlocked state is thus established, energization of the coil 234 is finished.

In the second embodiment, during movement of the piston rod 212 toward the unlock side by a hydraulic pressure, the attracting force between the permanent magnet 233 and the flange portion 235a of the yoke 235 is canceled by energizing the coil 234 of the magnetic portion 230. Consequently, it is possible to reduce a force required to retract the lock shaft 221 and the shaft moving member 231 from the piston rod 212 (move the lock shaft 221 and the shaft moving member 231 toward the rear cap 238) using the roller 213 of the piston rod 212 compared to a configuration in which the coil 234 is not energized in this event. As a result, the piston rod 212 can be immediately moved toward the unlock side (upward in FIG. 12), and the hydraulic pressure required to move the piston rod 212 toward the unlock side can be reduced.

In the second embodiment, in addition, in the parking locked state illustrated in FIG. 8, the roller 213 of the piston rod 212 is in abutment with the lower abutment surface 2211 of the lock shaft 221. Consequently, the stroke of movement of the piston rod 212 can be reduced to make the parking device 201 compact compared to a configuration in which the roller 213 is not in abutment with the lower abutment surface 2211 of the lock shaft 221 in the parking locked state. In addition, a transition can be immediately made from the parking locked state to the parking unlocked state. Further, it is possible to improve the durability of the lock shaft 221 and the roller 213 and to suppress generation of noise by preventing the roller 213 and the lower abutment surface 2211 from colliding against each other during movement of the piston rod 212 from the lock side toward the unlock side.

Further, the lower abutment surface 2211, which receives a force from the roller 213 during movement of the piston rod 212 toward the unlock side by a hydraulic pressure, has a radius of curvature that is smaller than the radius (radius of curvature) of the outer peripheral surface of the roller 213. Consequently, a force in the axial direction (a component of the force in the direction of the normal discussed above) applied from the roller 213 to the lock shaft 221 during movement of the piston rod 212 toward the unlock side can be increased, and thus a rise in hydraulic pressure to be supplied to the oil chamber 211f of the hydraulic unit 210 to release parking lock can be suppressed.

In addition, the roller 213 which serves as an abutment portion is rotatably supported by the piston rod 212 to enable the roller 213 to roll on the lower abutment surface 2211 and the upper abutment surface 2212. Thus, the frictional resistance between the roller 213 and the lower abutment surface 2211 and the upper abutment surface 2212 can be reduced to improve the wear resistance (durability) of the two components.

As illustrated in FIG. 13, the parking unlocked state can be maintained when a hydraulic pressure from the hydraulic control device is supplied to the oil chamber 211f of the hydraulic unit 210 after parking lock is released with the piston rod 212 moved toward the unlock side by a hydraulic pressure. In the second embodiment, as discussed above, the roller 213 of the piston rod 212 and the upper abutment surface 2212 of the distal end portion 2210 of the lock shaft 221 are spaced from each other when parking lock is released with the piston rod 212 moved toward the unlock side by a hydraulic pressure. In addition, the coil 234 is not energized. Thus, the lock shaft 221 and the shaft moving member 231 project into the hole portion 212h such that the upper abutment surface 2212 of the distal end portion 2210 of the lock shaft 221 overlaps a part of the outer peripheral surface of the roller 213 as seen in the axial direction of the piston rod 212 because of the attracting force between the permanent magnet 233 and the flange portion 235a of the yoke 235 and the elastic force of the spring 237, and the end surface 223a of the expanded diameter portion 223 of the lock shaft 221 on the small diameter portion 222 side is pressed against the flange portion 235a of the yoke 235. In the second embodiment, the depth of the recessed portion 2310 of the shaft moving member 231 (length of the permanent magnet 233 in the axial direction) is smaller than the length of the expanded diameter portion 223 of the lock shaft 221 in the axial direction. Therefore, at this time, the end surface 231a of the shaft moving member 231 (permanent magnet 233) is not in abutment with the flange portion 235a. Consequently, the permanent magnet 233 can be protected compared to a configuration in which the permanent magnet 233 is in abutment with the flange portion 235a. In addition, the end surface 223a of the expanded diameter portion 223 of the lock shaft 221 is pressed against the flange portion 235a of the yoke 235. Thus, the distance between the shaft moving member 231 (permanent magnet 233) and the flange portion 235a is short and constant. Consequently, the attracting force between the permanent magnet 233 and the flange portion 235a of the yoke 235 can be increased.

When a hydraulic pressure for the oil chamber 211f of the hydraulic unit 210 is reduced along with stop of the engine due to execution of idle stop or the like in the parking unlocked state illustrated in FIG. 13, the piston rod 212 is moved toward the lock side by the elastic force of the return spring 216, and the roller 213 of the piston rod 212 and the upper abutment surface 2212 of the distal end portion 2210 of the lock shaft 221 abut against each other. In the second embodiment, as discussed above, the sum of the attracting force between the permanent magnet 233 of the shaft moving member 231 and the flange portion 235a of the yoke 235 and the elastic force of the spring 237 at the time when the coil 234 is not energized is larger than the return spring component. Thus, movement of the piston rod 212 toward the lower side in the drawing, that is, toward the lock side, can be restricted. As a result, the parking unlocked state can be held even when a hydraulic pressure for the hydraulic unit 210 is reduced by execution of idle stop or the like. Moreover, as discussed above, the end surface 223a of the expanded diameter portion 223 of the lock shaft 221 is pressed against the flange portion 235a of the yoke 235, and thus the distance between the shaft moving member 231 (permanent magnet 233) and the flange portion 235a is short and constant, which makes it possible to increase the attracting force between the permanent magnet 233 and the flange portion 235a of the yoke 235. Thus, it is possible to hold the lock shaft 221 and the shaft moving member 231 (restrict movement of such components) with a relatively large holding force. In this event, in addition, it is not necessary to apply a current to the coil 234. Thus, it is possible to suppress electric power consumption, and to hold the parking unlocked state even when the coil 234 cannot be energized for some reason.

When energization of the coil 234 of the magnetic portion 230 is started in the parking unlocked state, the attraction between the permanent magnet 233 and the flange portion 235a of the yoke 235 is canceled by magnetic flux generated along with the energization. As discussed above, when a hydraulic pressure from the hydraulic control device is supplied to the oil chamber 211f of the hydraulic unit 210 to establish the parking unlocked state, the end surface 223a of the expanded diameter portion 223 of the lock shaft 221 is pressed against the flange portion 235a of the yoke 235, and thus the distance between the shaft moving member 231 (permanent magnet 233) and the flange portion 235a is short and constant. Thus, magnetic flux for canceling the attracting force between the permanent magnet 233 and the flange portion 235a of the yoke 235 can be generated more efficiently when energization of the coil 234 is started. In addition, the spring constant of the spring 237 is smaller than the spring constant of the return spring 216. Thus, when a hydraulic pressure for the oil chamber 211f of the hydraulic unit 210 is reduced while energizing the coil 234, working oil flows out of the oil chamber 211f via the working oil inlet/discharge hole 211h, and the piston 214 and the piston rod 212 are moved downward in the drawing, that is, toward the lock side, by the elastic force of the return spring 216. Then, the roller 213 of the piston rod 212 and the upper abutment surface 2212 of the distal end portion 2210 of the lock shaft 221 abut against each other, a force in the direction of the normal is applied from the roller 213 to the upper abutment surface 2212, and the lock shaft 221 and the shaft moving member 231, which are not fixed to each other, are moved together rightward in the drawing, that is, toward the rear cap 238, against the elastic force of the spring 237 by a component in the second direction (axial direction of the lock shaft 221) of the force in the direction of the normal. At this time, the roller 213 rolls on the upper abutment surface 2212.

Then, when the roller 213 is moved away from the upper abutment surface 2212 of the lock shaft 221 along with movement of the piston rod 212 toward the lock side, the lock shaft 221 and the lock shaft 221 and the shaft moving member 231 are urged by the spring 237 toward the deep side of the hole portion 212h (leftward in FIG. 13), and the roller 213 rolls on the lower abutment surface 2211 of the lock shaft 221. At this time, the roller 213 is moved toward the unlock side (downward in FIG. 13) together with the piston rod 212, and thus a force that moves the lock shaft 221 etc. toward the rear cap 238 is not applied from the roller 213 to the lower abutment surface 2211. After that, the piston rod 212 is further moved toward the lock side by a hydraulic pressure, and stopped at the position illustrated in FIG. 8 (assembled state).

In this way, during a period since movement of the piston rod 212 toward the lock side by the elastic force of the return spring 216 is started until such movement is stopped, the detent lever 208 is turned counterclockwise in FIG. 7 about the support shaft 208s, and the parking rod 204 is moved leftward in FIG. 7. Consequently, the parking pawl 203 is pressed by the cam member 205, which is urged by the cam spring 207 along with movement of the parking rod 204, so as to engage with the parking gear 202, and parking lock is performed.

Also during movement of the piston rod 212 toward the lock side, as during movement of the piston rod 212 toward the unlock side, the roller 213 rolls on the lower abutment surface 2211 and the upper abutment surface 2212. Thus, the frictional resistance between the roller 213 and the lower abutment surface 2211 and the upper abutment surface 2212 can be reduced to improve the wear resistance (durability) of the two components.

In the parking device 201 according to the second embodiment described above, the electromagnetic unit 220 is disposed (attached to the hydraulic unit 210) such that the moving direction of the lock shaft 221 and the shaft moving member 231 (the plunger 232 and the permanent magnet 233) of the electromagnetic unit 220 is orthogonal to the moving direction of the piston rod 212 of the hydraulic unit 210. Consequently, such components can be suitably disposed in a limited space compared to a configuration in which the two components are disposed (on the same axis) so as to be movable in the same direction.

In the parking device 201 according to the second embodiment, in addition, in the parking locked state, the roller 213 of the piston rod 212 is in abutment with the lower abutment surface 2211 of the lock shaft 221. Consequently, it is possible to make the parking device 201 compact by reducing the stroke of movement of the piston rod 212 when switching is performed to the parking unlocked state compared to a configuration in which the two components are not in abutment with each other. In addition, a transition can be immediately made from the parking locked state to the parking unlocked state. Further, it is possible to improve the durability of the lock shaft 221 and the roller 213 and to suppress generation of noise by preventing the roller 213 and the lower abutment surface 2211 from colliding against each other during movement of the piston rod 212 from the lock side toward the unlock side.

In the parking device 201 according to the second embodiment, when the coil 234 is not energized in the parking unlocked state, the lock shaft 221 and the shaft moving member 231 are locked so as not to be retracted from the piston rod 212 by the attracting force between the permanent magnet 233 and the flange portion 235a of the yoke 235, and movement of the piston rod 212 toward the lock side (switching to the parking locked state) by the elastic force of the return spring 216 is restricted. When the coil 234 is energized in the parking unlocked state, on the other hand, the attracting force between the permanent magnet 233 and the flange portion 235a of the yoke 235 is canceled, retraction of the lock shaft 221 and the shaft moving member 231 from the piston rod 212 is allowed, and movement of the piston rod 212 toward the lock side by the elastic force of the return spring 216 is allowed. Thus, it is not necessary to energize the coil 234 in order to hold the parking unlocked state. Thus, it is possible to suppress electric power consumption, and to suppress switching to the parking locked state when the coil 234 cannot be energized for some reason. In addition, when a hydraulic pressure that resists against the elastic force of the return spring 216 is no longer applied to the piston rod 212 when the coil 234 is energized in the parking unlocked state, the parking locked state can be established more adequately.

In the parking device 201 according to the second embodiment, the permanent magnet 233 is fixed to the plunger 232 to constitute the shaft moving member 231, and the length of the permanent magnet 233 in the axial direction is shorter than the length of the expanded diameter portion 223 of the lock shaft 221 in the axial direction. Consequently, abutment of the permanent magnet 233 against the flange portion 235a of the yoke 235 can be suppressed during movement of the shaft moving member 231 to protect the permanent magnet 233.

In the parking device 201 according to the second embodiment, the lock shaft 221 and the shaft moving member 231 are urged by the elastic force of the spring 237 (and the attraction between the permanent magnet 233 and the flange portion 235a of the yoke 235) such that the bottom surface 2310b (an end surface of the plunger 232 on one end side) of the recessed portion 2310 of the shaft moving member 231 abuts against the end surface 223b of the expanded diameter portion 223 of the lock shaft 221, and such that the end surface 223a of the expanded diameter portion 223 abuts against the flange portion 235a of the yoke 235. Consequently, the lock shaft 221 and the shaft moving member 231 are urged together toward the piston rod 212 so that the end surface 223a of the expanded diameter portion 223 of the lock shaft 221 abuts against the flange portion 235a. Thus, rattle of the lock shaft 221 in the moving direction can be suppressed.

In the parking device 201 according to the second embodiment, the expanded diameter portion 223 of the lock shaft 221 is inserted into the recessed portion 2310 of the shaft moving member 231 (the permanent magnet 233 is positioned so as to surround the outer periphery of the expanded diameter portion 223). Consequently, even if the lock shaft 221 rattles in the radial direction, such rattle can be absorbed by the clearance between the outer peripheral surface of the expanded diameter portion 223 and the inner peripheral surface of the permanent magnet 233. As a result, a magnetic gap formed at the outer periphery of the plunger 232 can be reduced. In addition, the lock shaft 221 is formed from a non-magnetic body. Thus, leakage of magnetic flux from the electromagnetic unit 220 can be reduced. As a result, the magnetic efficiency during application of a current to the coil 234 can be enhanced while suppressing an increase in size of the electromagnetic unit 220.

In the parking device 201 according to the second embodiment, in the parking unlocked state, when the coil 234 is energized to cancel the attracting force between the permanent magnet 233 and the flange portion 235a of the yoke 235 and a hydraulic pressure for the oil chamber 211f of the hydraulic unit 210 is reduced, the piston rod 212 is moved toward the lock side by the elastic force of the return spring 216 while retracting the lock shaft 221 and the shaft moving member 231 (moving the lock shaft 221 and the shaft moving member 231 toward the rear cap 238). At this time, however, a hydraulic pressure (working oil) from the hydraulic control device may be supplied to the spring chamber 211s of the hydraulic unit 210 as indicated by the dash-double-dot line in FIG. 13. With this configuration, the piston rod 212 can be moved to the lock side more immediately.

In the parking device 201 according to the second embodiment, when a transition is made from the parking locked state to the parking unlocked state, the piston rod 212 is moved toward the unlock side by a hydraulic pressure while energizing the coil 234 of the magnetic portion 230 to cancel the attracting force between the permanent magnet 233 and the flange portion 235a. However, the piston rod 212 may be moved toward the unlock side by a hydraulic pressure without energizing the coil 234. In this case, in order to move the piston rod 212, there is required a hydraulic pressure which resists against the elastic force of the return spring 216 and at which a rightward component, in FIG. 8, of the force applied from the roller 213 of the piston rod 212 to the lower abutment surface 2211 of the lock shaft 221 is larger than the sum (a leftward force, in FIG. 8, applied to the lock shaft 221 and the shaft moving member 231) of the attracting force between the permanent magnet 233 and the flange portion 235a of the yoke 235 and the elastic force of the spring 237, that is, a hydraulic pressure that is higher by an amount for resisting against the attracting force between the permanent magnet 233 and the flange portion 235a of the yoke 235 compared to the second embodiment in which the coil 234 is energized.

In the parking device 201 according to the second embodiment, the difference between the length of the expanded diameter portion 223 in the axial direction and the depth of the recessed portion 2310 of the shaft moving member 231 (length of the permanent magnet 233 in the second direction) is smaller than the clearance between the outer peripheral surface of the expanded diameter portion 223 of the lock shaft 221 and the inner peripheral surface of the recessed portion 2310 of the shaft moving member 231 (inner peripheral surface of the permanent magnet 233). However, the two values may be determined to be about the same as each other, or the clearance between the outer peripheral surface of the expanded diameter portion 223 of the lock shaft 221 and the inner peripheral surface of the recessed portion 2310 of the shaft moving member 231 may be smaller than the difference between the length of the expanded diameter portion 223 in the axial direction and the depth of the recessed portion 2310 of the shaft moving member 231.

In the parking device 201 according to the second embodiment, the length of the permanent magnet 233 in the axial direction (left-right direction in the drawing) is smaller than the length of the expanded diameter portion 223 of the lock shaft 221 in the axial direction. However, the length of the permanent magnet 233 in the axial direction may be the same as the length of the expanded diameter portion 223 of the lock shaft 221 in the axial direction.

Figure 14:
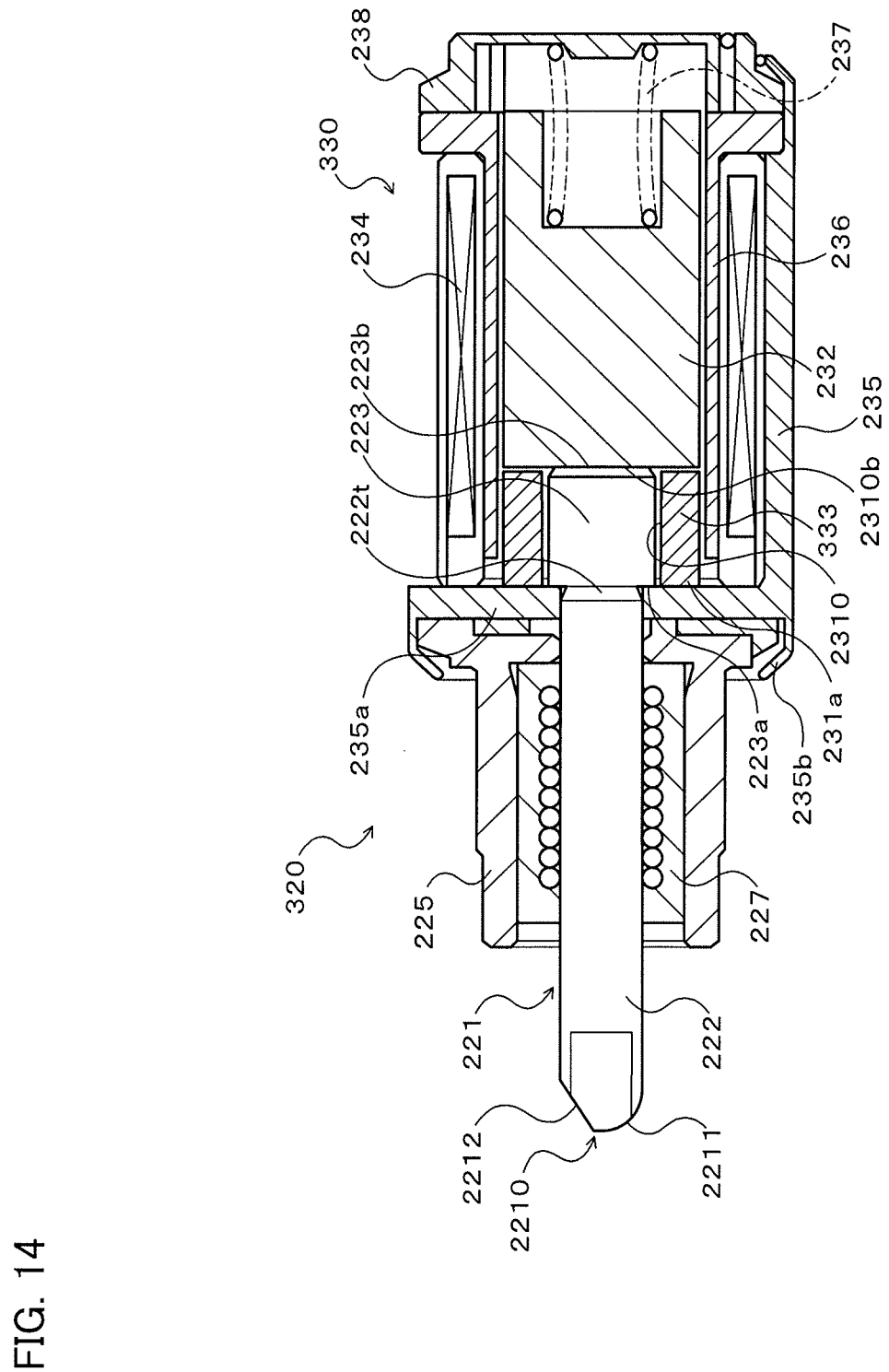
FIG. 14 is a diagram illustrating a schematic configuration of an electromagnetic unit 320 according to a modification.
Figure 15:
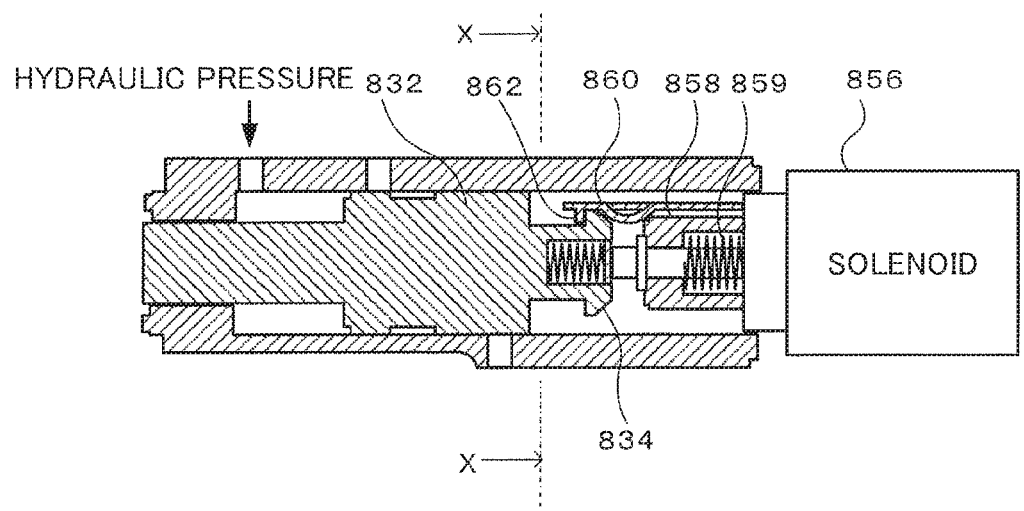
FIG. 15 is a diagram illustrating an example of the configuration of a locking mechanism of a parking device according to the related art.
Figure 16:
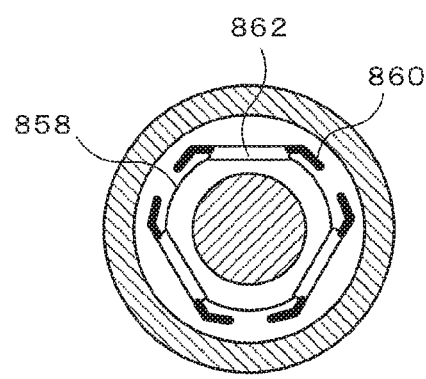
FIG. 16 is a cross-sectional view taken along the line X-X of FIG. 15.
Figure 17:
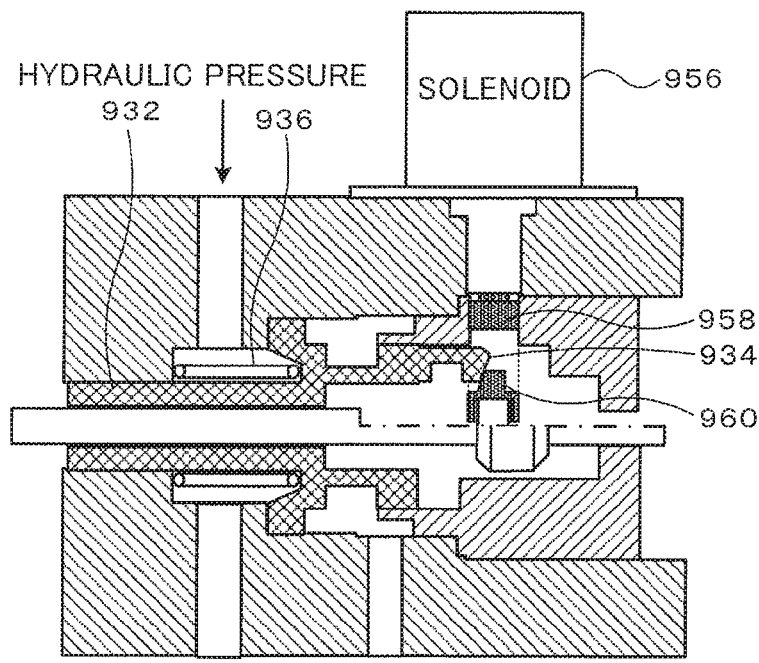
FIG. 17 is a diagram illustrating an example of the configuration of a locking mechanism (in a parking unlocked state) of a parking device according to the related art.
Figure 18:
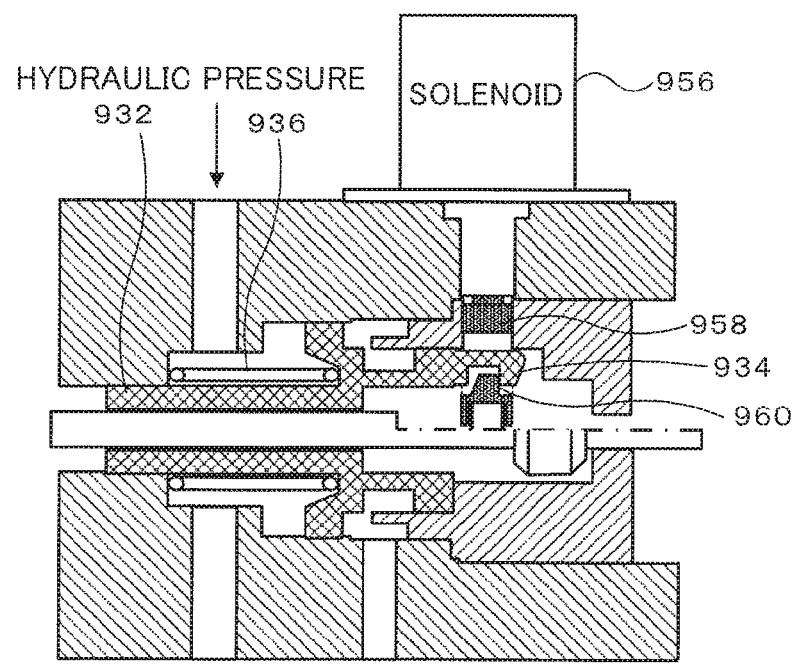
FIG. 18 is a diagram illustrating an example of the configuration of the locking mechanism (in a parking locked state) of the parking device according to the related art.

In the parking device 201 according to the second embodiment, as illustrated in FIG. 10, the permanent magnet 233 of the magnetic portion 230 is fixed to the plunger 232 (constituted integrally with the plunger 232). As illustrated in an electromagnetic unit 320 according to the modification of FIG. 14, however, a permanent magnet 333 of a magnetic portion 330 may be fixed to the flange portion 235a of the yoke 235. In this case, the lock shaft 221 and the plunger 232 are urged (locked) together toward the shaft holder 225 by the attracting force between the permanent magnet 333 and the plunger 232. Also in this case, as illustrated in the drawing, the length of the permanent magnet 333 in the axial direction (left-right direction in the drawing) is smaller than the length of the expanded diameter portion 223 of the lock shaft 221 in the axial direction. Thus, abutment of the permanent magnet 333 against the plunger 232 can be suppressed during movement of the lock shaft 221 and the plunger 232 to protect the permanent magnet 333. The length of the permanent magnet 333 in the axial direction may be the same as the length of the expanded diameter portion 223 of the lock shaft 221 in the axial direction.

In the parking device 201 according to the second embodiment, the lower abutment surface 2211 (an abutment surface on the lock side) of the distal end portion 2210 of the small diameter portion 222 of the lock shaft 221 is formed as a curved surface that is convex toward the lock side and arcuate in section. However, the lower abutment surface 2211 may be formed as a curved surface that is convex toward the lock side and not arcuate in section, or may be formed as an (flat) inclined surface inclined toward the lock side at a constant angle from the distal end portion 2210 side toward the expanded diameter portion 223 side.

In the parking device 201 according to the second embodiment, the upper abutment surface 2212 (an abutment surface on the unlock side) of the distal end portion 2210 of the small diameter portion 222 of the lock shaft 221 is formed as an (flat) inclined surface inclined toward the unlock side at a constant angle. However, the upper abutment surface 2212 may be formed as a curved surface that is convex toward the unlock side in section.

In the parking device 201 according to the second embodiment, the small diameter portion 222 of the lock shaft 221 is formed such that the outer peripheral surface of the small diameter portion 222 around the boundary with the expanded diameter portion 223 is tapered (becomes smaller in outside diameter) from the distal end portion 2210 side toward the end surface 223a of the expanded diameter portion 223. However, the outer peripheral surface of the small diameter portion 222 may be formed to be constant in outside diameter, rather than being tapered.

In the parking device 201 according to the second embodiment, the bearing member 227 which is fixed inside the shaft holder 225 and which slidably supports the outer peripheral surface of the small diameter portion 222 of the lock shaft 221 is provided. However, the bearing member 227 may not be provided.

In the parking device 201 according to the second embodiment, when the electromagnetic unit 220 is attached to the hydraulic unit 210, the lower abutment surface 2211 of the distal end portion 2210 of the lock shaft 221 and the outer peripheral surface of the roller 213 abut against each other, and a slight gap is formed between the end surface 223a of the expanded diameter portion 223 of the lock shaft 221 and the flange portion 235a of the yoke 235. However, the end surface 223a of the expanded diameter portion 223 of the lock shaft 221 and the flange portion 235a of the yoke 235 may abut against each other. In this case, the outer peripheral surface of the roller 213 of the piston rod 212 may be spaced toward the lock side from the lower abutment surface 2211 of the distal end portion 2210 of the lock shaft 221.

In the parking device 201 according to the second embodiment, the roller 213 which is rotatably supported by the support shaft 212s which is supported by the piston rod 212 is used as the abutment portion of the piston rod 212. However, a circular column body rotatably supported by the piston rod 212 may also be used, or a component that is not rotatable with respect to the piston rod 212 (e.g. a component that is similar to the support shaft 212s) may also be used.

In the parking device 201 according to the second embodiment, the lock shaft 221 and the plunger 232 are constituted separately from each other. However, such components may be constituted integrally with each other.

In the parking device 201 according to the second embodiment, the piston rod 212 is urged downward in FIG. 8 (toward the lock side) by the elastic force of the return spring 216, and moved upward in FIG. 8 (toward the unlock side) by a hydraulic pressure that resists against the elastic force of the return spring 216. Conversely, however, the piston rod 212 may be urged toward the unlock side by the elastic force of a return spring, and may be moved toward the lock side by a hydraulic pressure that resists against the elastic force of the return spring.

In the first exemplary embodiment described above, the hydraulic unit 30 which includes the piston rod 32, the return spring 42, the piston 38, and the case 40 may, for example, corresponds to the "hydraulic unit", and the electromagnetic unit 50 which includes the solenoid shaft 52, the yoke 60, the coil 64, the core 66, and the spring 70 may, for example, corresponds to the "electromagnetic unit". In the second embodiment, the hydraulic unit 210 which includes the piston rod 212, the piston 214, the return spring 216, and the case 211 may, for example, corresponds to the "hydraulic unit", and the electromagnetic unit 220 which includes the lock shaft 221, the plunger 232, the permanent magnet 233, the coil 234, the yoke 235, the core 236, the spring 237, and the rear cap 238 may, for example, corresponds to the "electromagnetic unit".

While a mode for carrying out the present disclosure has been described above by way of embodiments, it is a matter of course that the present disclosure is not limited to the embodiments in any way, and that the present disclosure may be implemented in various forms without departing from the scope and sprit of the present disclosure.

The present disclosure is applicable to, for example, the parking device manufacturing industry and so forth.

The invention claimed is:

1. A parking device mounted on a vehicle to establish a parking locked state and a parking unlocked state, comprising:
   a hydraulic unit that includes a first shaft member that is movable in a first direction, a first elastic member that urges the first shaft member toward a lock side on which the parking locked state is established, in the first direction, using an elastic force, and a hydraulic pressure generation portion that moves the first shaft member toward an unlock side which is opposite to the lock side, in the first direction, using a hydraulic pressure against the elastic force of the first elastic member; and
   an electromagnetic unit that includes a second shaft member that is movable in a second direction which is orthogonal to the first direction, a second elastic member that urges the second shaft member toward the first shaft member, in the second direction, using an elastic force, and a magnetic force holding portion that can hold the second shaft member on a side of the first shaft member using a magnetic force, wherein:
   the first shaft member is provided with an abutment portion that can abut against a distal end portion of the second shaft member;
   a lock side surface of the distal end portion of the second shaft member on the lock side is formed to be inclined toward the lock side from a distal end side toward a base end side of the second shaft member, the lock side surface of the second shaft member is formed as a curved surface that is convex toward the lock side, and an unlock side surface of the distal end portion of the second shaft member on the unlock side is formed to be inclined toward the unlock side at a constant angle from a distal end side toward a base end side of the second shaft member.

2. The parking device according to claim 1, wherein the second shaft member of the electromagnetic unit is moved away from the first shaft member, when the parking locked state is established and the abutment portion of the first shaft member is in abutment with the lock side surface of the second shaft member, compared to when the abutment portion of the first shaft member is not in abutment with the distal end portion of the second shaft member.

3. The parking device according to claim 2, wherein the lock side surface of the second shaft member is formed as a curved surface that is convex toward the lock side.

4. The parking device according to claim 3, wherein:
the abutment portion of the first shaft member is formed in a cylindrical shape; and
the lock side surface of the second shaft member is formed as a curved surface with a radius of curvature that is smaller than a radius of curvature of the abutment portion of the first shaft member.

5. The parking device according to claim 4, wherein an unlock side surface of the distal end portion of the second shaft member on the unlock side is formed to be inclined toward the unlock side at a constant angle from a distal end side toward a base end side of the second shaft member.

6. The parking device according to claim 5, wherein:
the magnetic force holding portion is capable of holding the second shaft member on the first shaft member side using the magnetic force when a coil is energized; and
the electromagnetic unit is configured to allow the second shaft member to be moved away from the first shaft member, in the second direction, by a force applied from the abutment portion of the first shaft member to the distal end portion of the second shaft member during movement of the first shaft member when the coil is not energized.

7. The parking device according to claim 6, wherein:
the magnetic force holding portion is a permanent magnet that holds the second shaft member on the first shaft member side using the magnetic force; and
the electromagnetic unit is configured to release holding of the second shaft member by the permanent magnet and allow the second shaft member to be moved away from the first shaft member, in the second direction, by a force applied from the abutment portion of the first shaft member to the distal end portion of the second shaft member during movement of the first shaft member when the coil is energized.

8. The parking device according to claim 1, wherein:
the magnetic force holding portion is capable of holding the second shaft member on the first shaft member side using the magnetic force when a coil is energized; and
the electromagnetic unit is configured to allow the second shaft member to be moved away from the first shaft member, in the second direction, by a force applied from the abutment portion of the first shaft member to the distal end portion of the second shaft member during movement of the first shaft member when the coil is not energized.

9. The parking device according to claim 1, wherein:
the magnetic force holding portion is a permanent magnet that holds the second shaft member on the first shaft member side using the magnetic force; and
the electromagnetic unit is configured to release holding of the second shaft member by the permanent magnet and allow the second shaft member to be moved away from the first shaft member, in the second direction, by a force applied from the abutment portion of the first shaft member to the distal end portion of the second shaft member during movement of the first shaft member when the coil is energized.

10. The parking device according to claim 1, wherein the first shaft member is formed with a hole portion into which the distal end portion of the second shaft member is advanceable and which penetrates through the first shaft member.

11. The parking device according to claim 1, wherein the electromagnetic unit further includes a bearing member that is fixed to the magnetic force holding portion, and the bearing member slidably supports the second shaft member in the second direction.

12. The parking device according to claim 1, wherein the abutment portion of the first shaft member is configured not to abut against the distal end portion of the second shaft member when the first shaft member establishes the parking locked state or the parking unlocked state.

13. The parking device according to claim 1, further comprising: a detent lever that is coupled with a parking rod that urges a parking pawl engaged with a parking gear, and a case that slidably supports the first shaft member in the first direction, the first shaft member is formed by a piston that forms the hydraulic pressure generation portion together with a case, and a piston rod of which one end portion is fixed to the piston and the other end portion is coupled with the detent lever, and wherein a hole portion is provided in the piston rod.

* * * * *